US011255445B2

(12) United States Patent
Jenks et al.

(10) Patent No.: US 11,255,445 B2
(45) Date of Patent: Feb. 22, 2022

(54) HIGH RESOLUTION BALL VALVE WITH 270 DEGREE ROTATION

(71) Applicant: Johnson Controls Technology Company, Auburn Hills, MI (US)

(72) Inventors: Russell T. Jenks, Racine, WI (US); Kyle M. Bero, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/884,952

(22) Filed: May 27, 2020

(65) Prior Publication Data

US 2020/0378505 A1 Dec. 3, 2020

Related U.S. Application Data

(60) Provisional application No. 62/854,197, filed on May 29, 2019.

(51) Int. Cl.
*F16K 5/06* (2006.01)

(52) U.S. Cl.
CPC .......... *F16K 5/0605* (2013.01); *F16K 5/0647* (2013.01)

(58) Field of Classification Search
CPC ............................. F16K 5/0605; F16K 5/0647
See application file for complete search history.

(56) References Cited

U.S. PATENT DOCUMENTS

| 1,938,425 A | 12/1933 | Hilkey |
| 1,958,228 A | 5/1934 | Beardsley |
| 3,090,396 A | 5/1963 | Rudelick |
| 3,542,337 A * | 11/1970 | Scaramucci ......... F16K 5/0605 251/209 |
| 3,935,108 A | 1/1976 | Forgues |
| 4,212,321 A | 7/1980 | Hulsey |
| 4,232,709 A | 11/1980 | Zoric |
| 4,651,775 A | 3/1987 | Okada |

(Continued)

FOREIGN PATENT DOCUMENTS

| BE | 430324 A | 10/1938 |
| DE | 19703042 A1 | 4/2007 |

(Continued)

OTHER PUBLICATIONS

Bellimo Ball Valve Features and Benefits, Technical Document, Bellimo Aircontrols (USA), Inc., dated Jun. 2013, 55 pages.

(Continued)

*Primary Examiner* — Kevin L Lee
(74) *Attorney, Agent, or Firm* — Foley & Lardner LLP

(57) ABSTRACT

A valve assembly is disclosed. The valve assembly may a valve body defined by an inlet port, an outlet port and flange. A movable valve member comprises an inlet opening extending from a leading edge surface present at a narrow slot region to trailing edge surface present at about a full bore region wherein the angle between the leading edge surface and trailing edge surface at the center of valve member is about 270 degrees. The fluid flow from the inlet port of the valve body to one or more outlet openings is controlled by the rotation of the valve member. Rotation of movable valve member enables linear controlling of the fluid flow wherein the control of fluid flow is proportional to the degrees of rotation from 0 to about 270 degrees.

18 Claims, 19 Drawing Sheets

(56) References Cited

U.S. PATENT DOCUMENTS

| | | | |
|---|---|---|---|
| 4,681,133 A | 7/1987 | Weston | |
| 4,921,598 A | 5/1990 | Desch | |
| 5,009,244 A | 4/1991 | Grindley et al. | |
| 5,199,458 A | 4/1993 | Wen | |
| 5,671,911 A | 9/1997 | Piscitelli | |
| 5,839,470 A | 11/1998 | Hiejima et al. | |
| 6,098,957 A | 8/2000 | Vepy | |
| 6,216,736 B1 | 4/2001 | Benedetti | |
| 6,220,566 B1 | 4/2001 | Miller | |
| 6,585,003 B2 | 7/2003 | Steiner et al. | |
| 8,127,793 B2 | 3/2012 | Ito et al. | |
| 8,282,390 B2 | 10/2012 | Albizuri | |
| 8,413,684 B2 | 4/2013 | Thomas | |
| 8,479,772 B2 | 7/2013 | Petrovic et al. | |
| 8,602,058 B1 | 12/2013 | Del Castillo | |
| 10,215,294 B2 | 2/2019 | Ferrer Beltran | |
| 2003/0102036 A1 | 6/2003 | Sosa | |
| 2007/0039653 A1 | 2/2007 | Maggard | |
| 2010/0018399 A1 | 1/2010 | Barone | |
| 2014/0083510 A1 | 3/2014 | Blieske et al. | |
| 2016/0123479 A1* | 5/2016 | Keller et al. | F16K 47/02 251/309 |
| 2016/0356493 A1 | 12/2016 | Xie | |
| 2017/0114908 A1 | 4/2017 | Huang et al. | |
| 2019/0285186 A1* | 9/2019 | Tanghetti et al. | F16K 5/12 |

FOREIGN PATENT DOCUMENTS

| | | |
|---|---|---|
| DE | 10 2017 215 194 A1 | 2/2019 |
| EP | 0 864 788 A1 | 9/1998 |
| GB | 0 649 020 A | 1/1951 |
| JP | S58-142080 A | 8/1983 |
| JP | 2016-188693 A | 11/2016 |
| WO | WO-84/01799 | 5/1984 |
| WO | WO-2007/112532 A1 | 10/2007 |

OTHER PUBLICATIONS

Bellimo Characterized Control Valves Features and Benefits, Technical Document, Bellimo Aircontrols (USA), Inc., dated May 2012, 127 pages.

International Search Report and Written Opinion on PCT/US2020/034717, dated Sep. 9, 2020, 19 pages.

* cited by examiner

HIGH RESOLUTION BALL VALVE WITH 270 DEGREE ROTATION

CROSS-REFERENCE TO RELATED PATENT APPLICATION

This application claims the benefit of and priority to U.S. Provisional Patent Application No. 62/854,197 filed May 29, 2019, the entire disclosure of which is incorporated by reference herein.

BACKGROUND

Valves regulate, direct, and/or control the flow of a fluid (e.g., gases, liquids, fluidized solids, slurries, etc.) by opening, closing, or partially obstructing various passageways. Valves are often categorized based on the mechanism used to control fluid flow (e.g., ball valves, butterfly valves, choke valves, piston valves, plug valves, poppet valves, etc.).

Ball valves are a type of valve that typically include a spherical disc or valve member carried within a valve body. The spherical valve member includes a passage that can be selectively aligned with ports in the valve body by rotating the valve member relative to the valve body.

Referring now to FIG. 1, a two-way ball valve 100 available in conventional fluid control system is shown. The ball valve 100 includes a machined valve body 102 with an inlet port 104 and an outlet port 106. One or both of the inlet port 104 and the outlet port 106 is formed in a machined nut that is threadably coupled to the valve body 102. One or both of the inlet port 104 and the outlet port 106 are formed in the valve body 102. Fluid flow through the valve 100 may be controlled by utilizing a valve actuator (not shown) to rotate a valve member contained within the valve body 102 by a total of 90 degrees. The stroke of the valve member may have a different length (e.g., 270 degrees).

Valve 100 is further shown to include an actuator mounting flange 108 and a valve stem 110 that extends out of the valve body 102. One end of the valve stem 110 may be coupled to a valve actuator mounted against the mounting flange 108, while the opposite end of the valve stem 110 is configured to fit within a recess of the ball member such that rotation of the valve stem 110 by the valve actuator results in a corresponding rotation of the ball member.

Turning now to FIGS. 2-7, side views of the conventional two-way ball valve 100 with various flow limiting discs installed between the inlet port 104 and the ball member are shown. Each of the flow limiting discs may include optimized flow openings configured to enable equal percentage flow control of the valve 100. Referring specifically to FIG. 2, a flow limiting disc 200 is shown with a flow opening 202. Flow opening 202 is optimized to permit valve 100 to achieve a maximum flow coefficient (Cv) of 1.2 when installed in a valve with a half inch valve body (e.g., a VG1000 series valve sold by Johnson Controls, Inc.). The flow coefficient is a constant related to the geometry of the valve that is used to establish flow capacity and is expressed in imperial units as the flow of water through a valve at 60° F. in US gallons per minute (gpm) at a pressure drop of 1 pound per square inch (psi). Equal percentage control of a valve causes equal changes in valve position to result in equal percentage changes to the flow coefficient from the existing value.

Correct orientation of the flow control disc 200 relative to the valve body 102 is important because the flow opening 202 is not symmetrical and is optimized to result in equal percentage flow control. In other words, the constant height portion situated on the left side of the flow opening 202 is configured to align with the bore of the valve member as the valve member rotates from a fully closed position to a semi-opened position (e.g., between 0% open and approximately 50% open). The roughly triangular or increasing height portion situated on the right side of the flow opening 202 is configured to align with the bore of the valve member once the valve member rotates from a semi-opened position to a fully opened position (e.g., between approximately 50% open and 100% open). Further details of the operation of the ball valve 100 are included below with reference to FIGS. 9-14.

The size of the flow opening in the flow limiting disc is directly correlated with the maximum flow coefficient of the valve 100. For example, FIG. 3 depicts a flow limiting disc 300 with a flow opening 302 optimized to permit valve 100 to achieve a maximum Cv of 1.9, FIG. 4 depicts a flow limiting disc 400 with a flow opening 402 optimized to achieve a maximum Cv of 2.9, FIG. 5 depicts a flow limiting disc 500 with a flow opening 502 optimized to achieve a maximum Cv of 4.7, and FIG. 6 depicts a flow limiting disc 600 with a flow opening 602 optimized to achieve a maximum Cv of 7.4. FIG. 7, by contrast, depicts valve 100 without any flow limiting disc installed. When the valve member is rotated 90 degrees from the fully closed position to fully opened position as depicted in FIG. 7, the full bore opening 700 of the valve member is exposed to the inlet port 104, and valve 100 may achieve a maximum Cv of 11.7.

Referring now to FIG. 8, plot 800 relates valve position on the x-axis 802 in units of degrees rotation and the maximum flow coefficient on the y-axis 804 in imperial units (i.e., Cv) for various flow limiting discs as depicted in FIGS. 2-7. As shown, there is an inverse relationship between maximum flow and predictable equal percentage (i.e., linear) flow control. The flow limiting discs permitting maximum flow coefficients Cv of 1.2, 1.9, and 2.9 generally provide linear control (at least until the valve reaches an approximate rotation of 60 degrees), but the maximum flow through the valve 100 is constrained, resulting in a loss of total flow. By contrast, the flow limiting discs or the full bore configuration permitting maximum flow coefficients Cv of 4.7, 7.4, and 11.7 generally provide non-linear or less predictable control, but the maximum flow through the valve 100 is far higher than the flow limiting discs with smaller openings.

Turning now to FIGS. 9-14, the operation of the two-way ball valve 100 over a 90 degree rotational stroke is depicted. Although FIGS. 9-14 depict the two-way ball valve 100 with the flow disc 200 installed between the inlet port 104 and valve member 1000, any flow limiting disc having any other maximum flow coefficient may be utilized (e.g., flow limiting discs 300, 400, 500, or 600, described above with reference to FIGS. 3-6). The valve 100 may be operated without the use of a flow limiting disc. Referring specifically to FIGS. 9 and 10, a side view and a top cross-sectional view of the valve 100 in the closed position are respectively shown. In the closed position, any flow path for fluid through the flow disc opening 202 is blocked by valve member 1000, and a flow passage 1002 provided in the valve member 1000 is oriented perpendicularly to the flow direction 1004 extending from the inlet port 104 to the outlet port 106.

Referring now to FIGS. 11 and 12, a side view and a top cross-sectional view of the valve 100 in a partially (i.e., 50%) open position are respectively shown. Because the stroke of the valve member 1000 is 90 degrees between the fully closed position and the fully open position, when the valve 100 is in the 50% open position, the valve member 1000 has been rotated by the valve actuator 45 degrees from the fully closed position depicted in FIGS. 9 and 10. (Note: the valve is effectively closed between 0 and 20 degrees rotation.) The 45 degree rotation position permits a portion 1100 of the flow passage 1002 to align with the flow opening 202 of the flow limiting disc 200, such that some amount of flow 1200 is permitted to enter the valve 100 through the inlet port 104, travel through the valve member 1000 and depart through the outlet port 106.

Finally, referring to FIGS. 13 and 14, a side view and a top cross-sectional view of the valve 100 in the fully (i.e., 100%) open position are respectively shown. In the fully open position, the valve member 1000 has been rotated by the valve actuator 90 degrees from the fully closed position depicted in FIGS. 9 and 10. No portion of the flow opening 202 in the flow limiting disc 200 is blocked by the valve member 1000, and the flow passage 1002 is aligned with the inlet port 104 and the outlet port 106 such that a flow of fluid 1400 is permitted to travel through the valve 100 and achieve a maximum flow coefficient Cv of 1.2.

Referring to the description of the FIG. 1 to FIG. 14, it is evident that a linear control of fluid flow is only possible upto 60 degrees for flow limiting discs permitting maximum flow coefficients Cv of 1.2, 1.9, and 2.9. Moreover, the fluid flow for the flow limiting discs permitting maximum flow coefficients Cv of 4.7, 7.4, and 11.7 at full bore configuration is uncontrollable and further results in a non-linear control from closed position to full opened position.

Therefore, there is an utmost requirement of a valve which provides a maximum flow coefficient which is controllable linearly at the same time instance with respect to the rotation of the valve.

SUMMARY

According to one embodiment, a valve assembly is disclosed. The valve assembly may comprise a valve body which may be defined by an inlet port and an outlet port. The valve assembly may further comprise a movable valve member which may disposed in the enclosure and may comprise an inlet opening which may extend from a leading edge surface present at a narrow slot region to a trailing edge surface present at about a full bore region. The valve assembly may further comprise a central bore present within the movable valve member which may be configured to receive fluid from the inlet opening wherein the central bore extends below the movable valve member to form a base portion comprising one or more outlet openings. The fluid flow from the inlet port to the outlet port of the valve is controlled by the rotation of the valve member.

According to another embodiment, a valve stem is coupled to the movable valve member.

According to another embodiment, the valve body may further comprises a flange configured to engage with an actuator.

According to yet another embodiment, the valve stem portion may be configured to receive the rotation force from the actuator.

According to yet another embodiment, the angle between the leading edge surface present at the narrow slot region and the trailing edge surface present at about a full bore region at the center of the movable valve member is greater than 90 degrees.

According to yet another embodiment, the size of the inlet opening may increase from the leading edge surface present at the narrow slot region and may end at the trailing edge surface present at about a full bore region.

According to yet another embodiment, the inlet port and the outlet port may have a same center line and may be situated about 180 degrees apart having the movable valve member in between.

According to yet another embodiment, the rotation of the movable valve member portion from the leading edge to the trailing edge may enable linear controlling of the fluid flow from the valve assembly wherein the control of fluid flow may be proportional to the degrees of rotation from 0 to about 270 degrees.

According to yet another embodiment, a valve assembly is disclosed. The valve assembly may comprise a valve body defining an enclosure having an inlet port and an outlet port. The valve assembly may further comprise a movable valve member which may comprise an inlet opening extending about 270 degrees around a circumference of the movable valve member from a leading edge surface present at a narrow slot region to a trailing edge surface present at about a full bore region. The movable valve member may further comprise one or more outlet openings. The fluid flow from the inlet port of the valve body to the one or more outlet openings is controlled by a rotation of the movable valve member.

According to yet another embodiment, a valve stem may be coupled to the movable valve member.

According to yet another embodiment, the valve body may further comprises a flange configured to engage with an actuator.

According to yet another embodiment, the valve stem may be configured to receive the rotation force from the actuator.

According to yet another embodiment, wherein the one or more outlet opening are located at the base of the movable valve member.

According to yet another embodiment, the size of the inlet opening may increase from the leading edge surface present at the narrow slot region and ends at the trailing edge surface present at about a full bore region.

According to yet another embodiment, the movable valve member may comprise a through bore to enable the fluid flow to pass from the flow inlet opening to the one or more outlet openings.

According to yet another embodiment, the inlet port and the outlet port may be orthogonal to each other.

According to yet another embodiment, a rotation of the movable valve member from the leading edge to the trailing edge may enable linear controlling of the fluid flow from the valve assembly wherein the control of fluid flow may be proportional to the degrees of rotation from 0 to about 270 degrees.

According to yet another embodiment, a method of controlling a fluid flow through a valve assembly is disclosed. The method may comprise providing a valve body defining an enclosure having an inlet port and outlet port. The method may comprise providing a movable valve member disposed in the enclosure wherein the movable valve member comprising an inlet opening extending about 270 degrees around a circumference of the movable valve member from a leading edge surface present at a narrow slot region to a trailing edge surface present at about a full bore region. The method may cause the movable valve member to rotate to control fluid flow from the inlet port to the outlet port.

According to yet another embodiment, the inlet port and the outlet port either have a same center line and are situated about 180 degrees apart or are orthogonal to each other.

DETAILED DESCRIPTION

Referring generally to the FIGURES, systems for regulating fluid flow, including embodiments of ball valves with high resolution 270 degree rotation valve members are shown. The function of a ball valve is to modulate flow through a pipe by rotating a ball-shaped valve member within the valve between a fully closed position and a fully opened position. As the ball-shaped valve member rotates from the fully closed position to the fully opened position, the surface area of a bore extending through the valve member is increasingly exposed to an inlet port of the valve, and a greater amount of flow is permitted to pass through the valve. The embodiments of the present disclosure utilize a valve member with an optimized flow inlet and a valve actuator with a 270 degree rotational stroke to provide a valve assembly with highly predictable and controllable flow and a high maximum flow rate.

Figure 1:
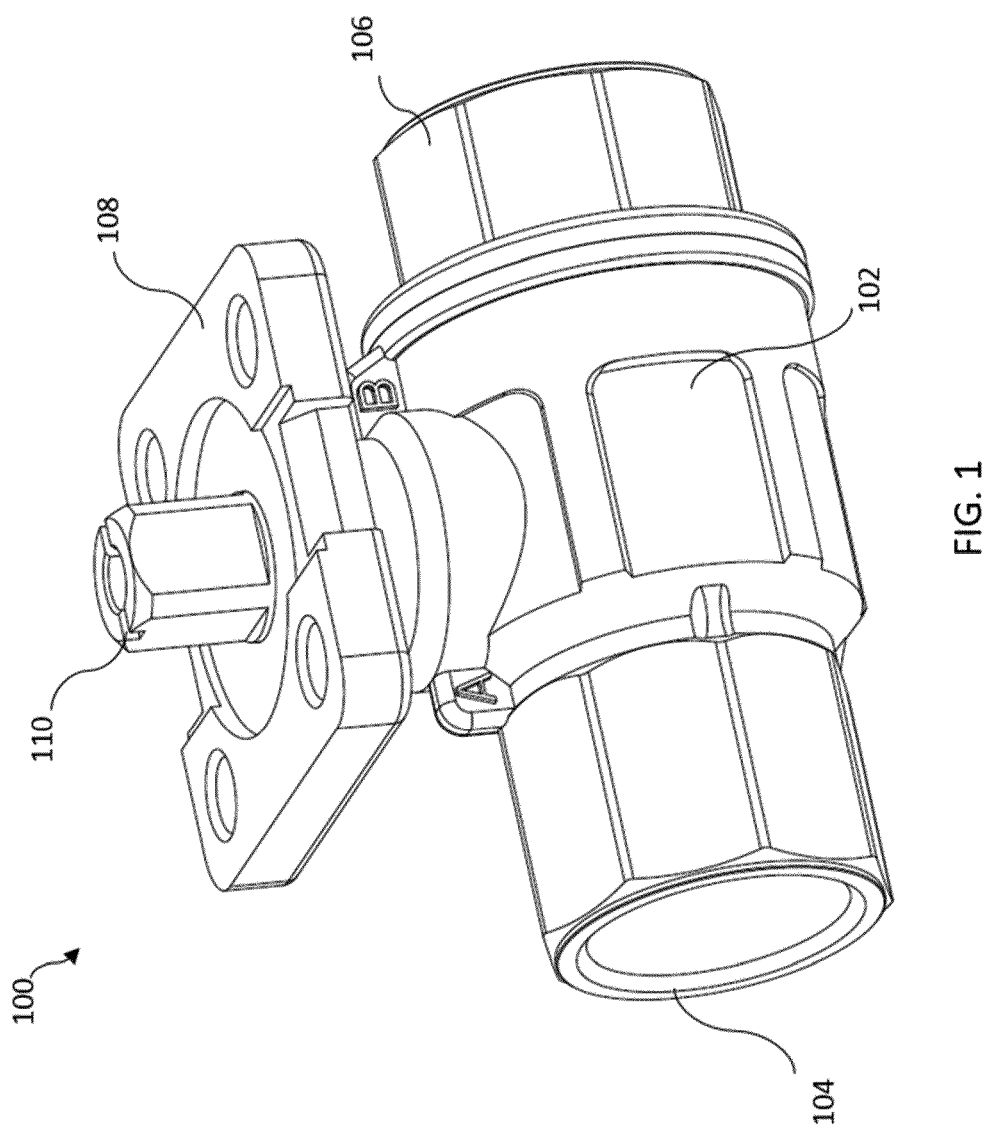
FIG. 1 is a two-way ball valve 100 available in conventional fluid control system.

Referring now to FIG. 1, a two-way ball valve 100 is shown, according to some embodiments. The ball valve 100 includes a machined valve body 102 with an inlet port 104 and an outlet port 106. In some embodiments, one or both of the inlet port 104 and the outlet port 106 is formed in a machined nut that is threadably coupled to the valve body 102. In other embodiments, one or both of the inlet port 104 and the outlet port 106 are formed in the valve body 102. Fluid flow through the valve 100 may be controlled by utilizing a valve actuator (not shown) to rotate a valve member contained within the valve body 102 by a total of 90 degrees. In other embodiments, the stroke of the valve member may have a different length (e.g., 270 degrees).

Ball valve 100 may be classified as such due to the spherical shape of the valve member. The valve member may include a circular central bore forming a flow passage. Although valve 100 is depicted as a two-way valve (i.e., a valve containing one inlet and one exit), the solutions described in the present disclosure may also be implemented in other types of valves having more than one inlet port and more than one outlet port (e.g., three-way valves, six-way valves).

Embodiments of the present patent specification describes a valve assembly with the implementation of a two way ball-valve 100, but the embodiments are not restricted by the two-way ball valve 100 and thus any movable valve member defined by one or more ways may be implemented to enable a fluid flow within the movable valve assembly and in between the plurality of ways (two-way, three-way, six-way).

Valve 100 is further shown to include an actuator mounting flange 108 and a valve stem 110 that extends out of the valve body 102. In some embodiments, one end of the valve stem 110 may be coupled to a valve actuator mounted against the mounting flange 108, while the opposite end of the valve stem 110 is configured to fit within a recess of the ball member such that rotation of the valve stem 110 by the valve actuator results in a corresponding rotation of the ball member.

In an exemplary embodiment, the valve stem which enables the transfer of rotational motion or rotational force from the actuator to the movable valve member may be excluded. In such embodiment, when the valve stem is excluded, the rotational motion or force may be enabled by a magnetic flux.

Figure 2:
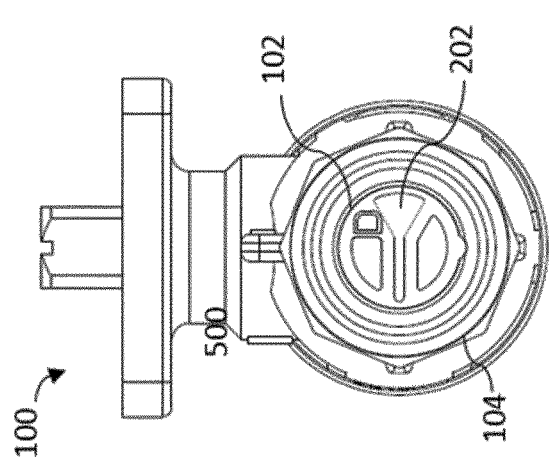
FIG. 2 is a side elevation view drawing of the two-way ball valve of FIG. 1 with a flow limiting disc having a maximum flow coefficient of 1.2.

Turning now to FIGS. 2-7, side views of the two-way ball valve 100 with various flow limiting discs between the inlet port 104 and the ball member are shown, according to some embodiments. Each of the flow limiting discs may include optimized flow openings configured to enable equal percentage flow control of the valve 100. Referring specifically to FIG. 2, a flow limiting disc 200 is shown with a flow opening 202. Flow opening 202 is optimized to permit valve 100 to achieve a maximum flow coefficient (Cv) of 1.2 when installed in a valve with a half inch valve body (e.g., a VG1000 series valve sold by Johnson Controls, Inc.). The flow coefficient is a constant related to the geometry of the valve that is used to establish flow capacity and is expressed in imperial units as the flow of water through a valve at 60° F. in US gallons per minute (gpm) at a pressure drop of 1 pound per square inch (psi)). Equal percentage control of a valve causes equal changes in valve position to result in equal percentage changes to the flow coefficient from the existing value.

Correct orientation of the flow control disc 200 relative to the valve body 102 is important because the flow opening 202 is not symmetrical and is optimized to result in equal percentage flow control. In other words, the constant height portion situated on the left side of the flow opening 202 is configured to align with the bore of the valve member as the valve member rotates from a fully closed position to a semi-opened position (e.g., between 0% open and approximately 50% open). The roughly triangular or increasing height portion situated on the right side of the flow opening 202 is configured to align with the bore of the valve member once the valve member rotates from a semi-opened position to a fully opened position (e.g., between approximately 50% open and 100% open). Further details of the operation of the ball valve 100 are included below with reference to FIGS. 9-14.

Figure 4:
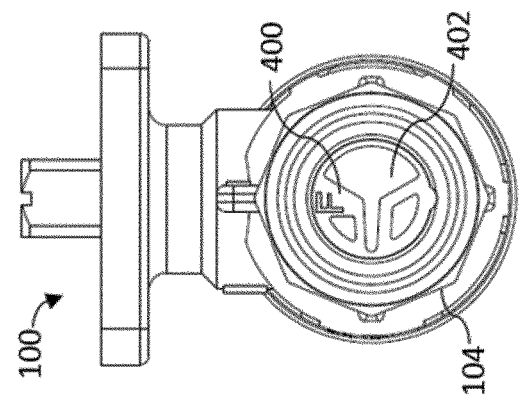
FIG. 4 is a side elevation view drawing of the two-way ball valve of FIG. 1 with a flow limiting disc having a maximum flow coefficient of 2.9.
Figure 7:
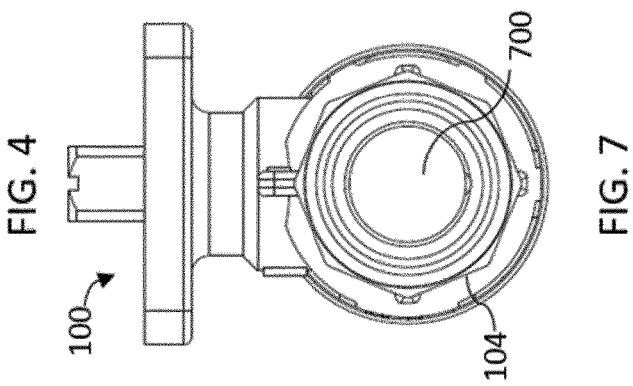
FIG. 7 is a side elevation view drawing of the two-way ball valve of FIG. 1 with a maximum flow coefficient of 11.7.
Figure 3:
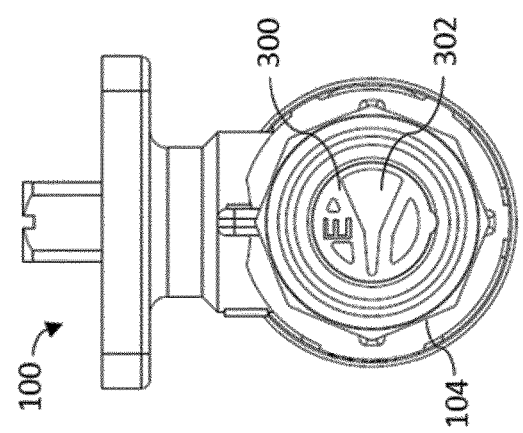
FIG. 3 is a side elevation view drawing of the two-way ball valve of FIG. 1 with a flow limiting disc having a maximum flow coefficient of 1.9.
Figure 6:
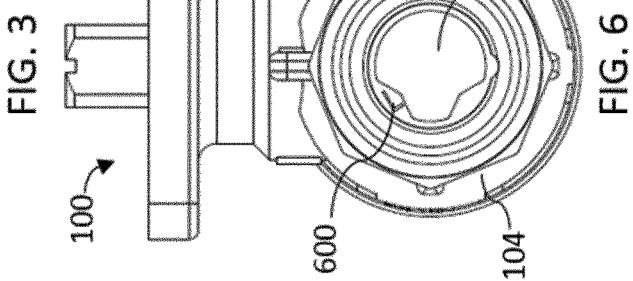
FIG. 6 is a side elevation view drawing of the two-way ball valve of FIG. 1 with a flow limiting disc having a maximum flow coefficient of 7.4.
Figure 5:
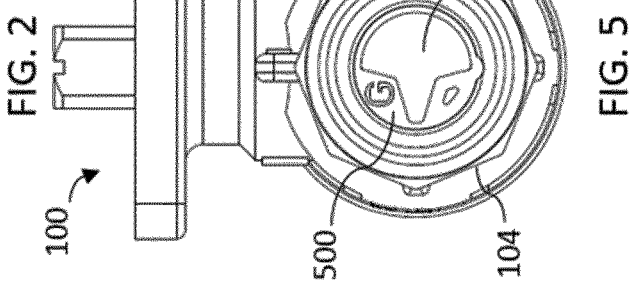
FIG. 5 is a side elevation view drawing of the two-way ball valve of FIG. 1 with a flow limiting disc having a maximum flow coefficient of 4.7.

The size of the flow opening in the flow limiting disc is directly correlated with the maximum flow coefficient of the valve 100. For example, FIG. 3 depicts a flow limiting disc 300 with a flow opening 302 optimized to permit valve 100 to achieve a maximum Cv of 1.9, FIG. 4 depicts a flow limiting disc 400 with a flow opening 402 optimized to achieve a maximum Cv of 2.9, FIG. 5 depicts a flow limiting disc 500 with a flow opening 502 optimized to achieve a maximum Cv of 4.7, and FIG. 6 depicts a flow limiting disc 600 with a flow opening 602 optimized to achieve a maximum Cv of 7.4. FIG. 7, by contrast, depicts valve 100 without any flow limiting disc installed. When the valve member is rotated 90 degrees from the fully closed position to fully opened position as depicted in FIG. 7, the full bore opening 700 of the valve member is exposed to the inlet port 104, and valve 100 may achieve a maximum Cv of 11.7.

Figure 8:
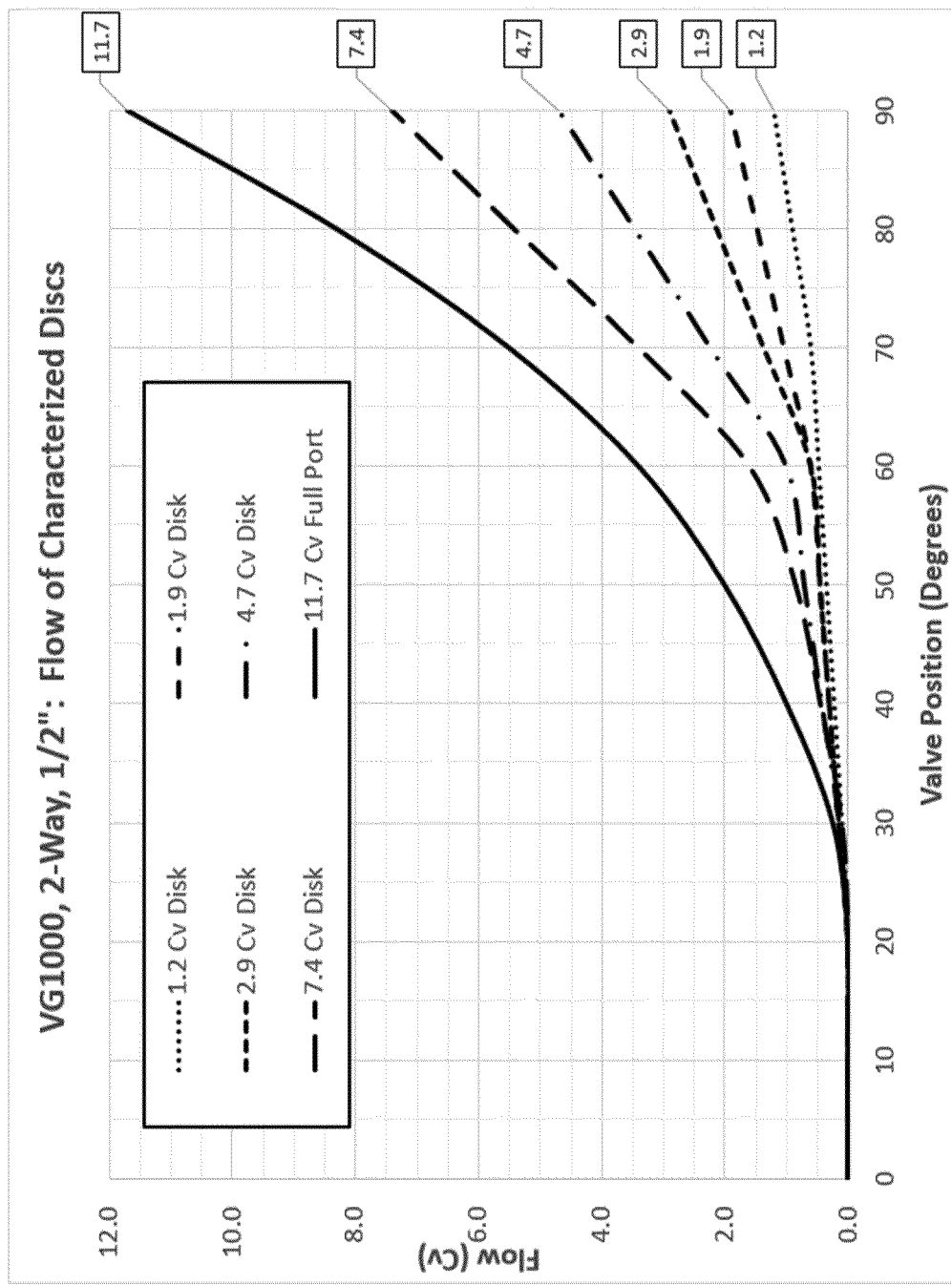
FIG. 8 is a plot relating valve position and flow for the two-way ball valve of FIG. 1.

Referring now to FIG. 8, plot 800 relates valve position on the x-axis 802 in units of degrees rotation and the maximum flow coefficient on the y-axis 804 in imperial units (i.e., Cv) for various flow limiting discs as depicted in FIGS. 2-7. As shown, there is an inverse relationship between maximum flow and predictable equal percentage (i.e., linear) flow control. The flow limiting discs permitting maximum flow coefficients Cv of 1.2, 1.9, and 2.9 generally provide linear control (at least until the valve reaches an approximate rotation of 60 degrees), but the maximum flow through the valve 100 is constrained, resulting in a loss of total flow. By contrast, the flow limiting discs or the full bore configuration permitting maximum flow coefficients Cv of 4.7, 7.4, and 11.7 generally provide non-linear or less predictable control, but the maximum flow through the valve 100 is far higher than the flow limiting discs with smaller openings.

Figure 10:
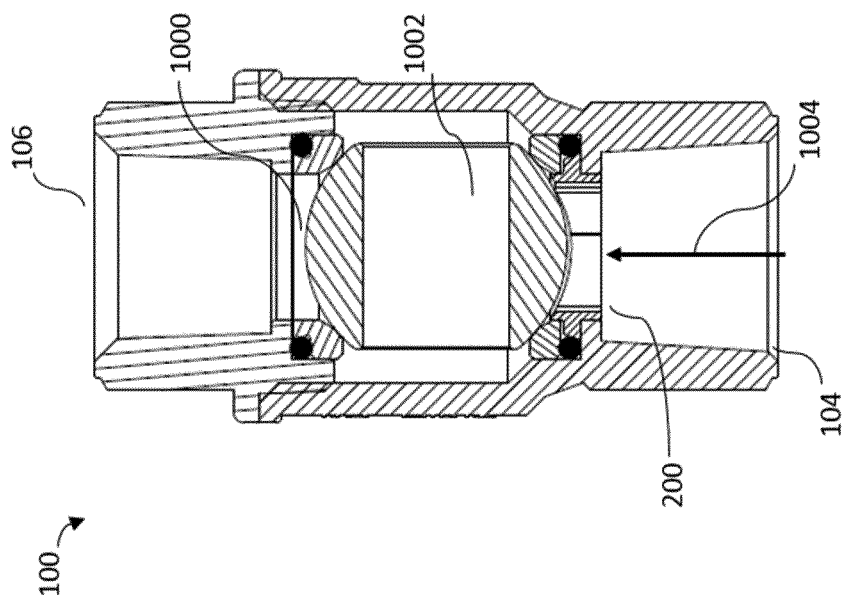
FIG. 10 is a top cross-sectional view drawing of the two-way ball valve of FIG. 9 in the closed position.
Figure 9:
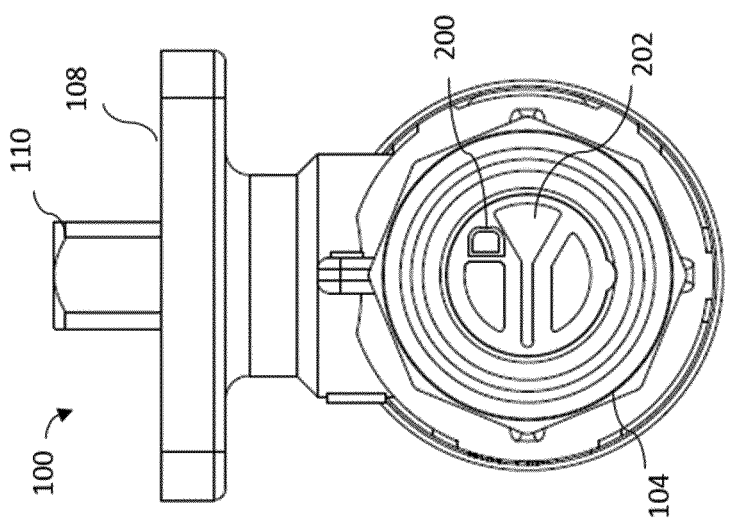
FIG. 9 is a side elevation view drawing of the two-way ball valve of FIG. 2 in the closed position.

Turning now to FIGS. 9-14, the operation of the two-way ball valve 100 over a 90 degree rotational stroke is depicted, according to some embodiments. Although FIGS. 9-14 depict the two-way ball valve 100 with the flow disc 200 installed between the inlet port 104 and valve member 1000, any flow limiting disc having any other maximum flow coefficient may be utilized (e.g., flow limiting discs 300, 400, 500, or 600, described above with reference to FIGS. 3-6). In other embodiments, the valve 100 may be operated without the use of a flow limiting disc. Referring specifically to FIGS. 9 and 10, a side view and a top cross-sectional view of the valve 100 in the closed position are respectively shown. In the closed position, any flow path for fluid through the flow disc opening 202 is blocked by valve member 1000, and a flow passage 1002 provided in the valve member 1000 is oriented perpendicularly to the flow direction 1004 extending from the inlet port 104 to the outlet port 106.

Figure 12:
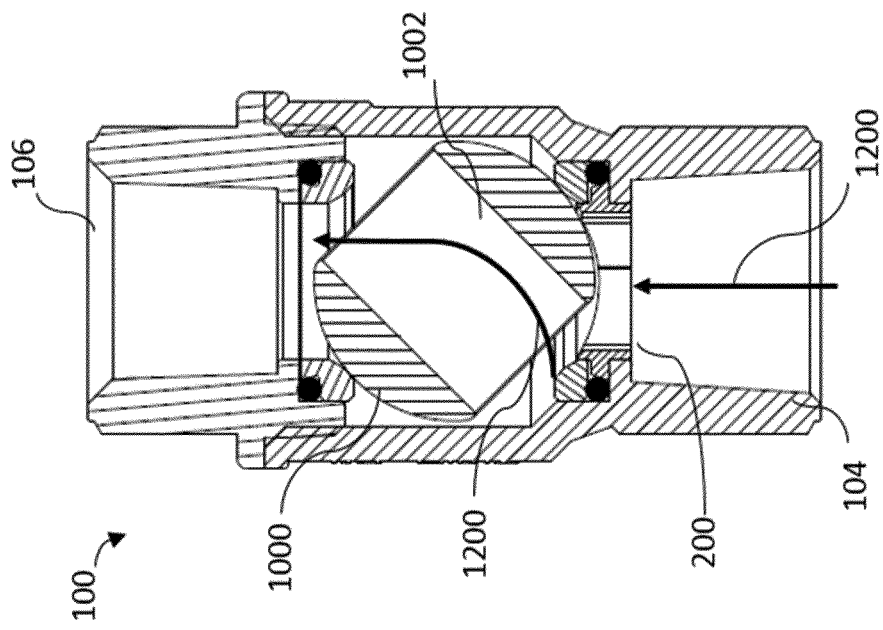
FIG. 12 is a top cross-sectional view drawing of the two-way ball valve of FIG. 11 in the 50% open position.
Figure 11:
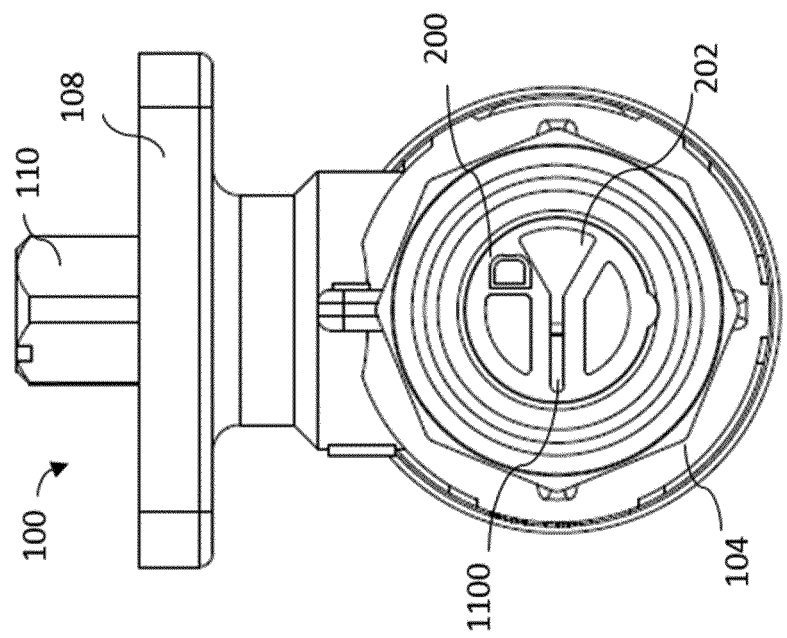
FIG. 11 is a side elevation view drawing of the two-way ball valve of FIG. 2 in the 50% open position.

Referring now to FIGS. 11 and 12, a side view and a top cross-sectional view of the valve 100 in a partially (i.e., 50%) open position are respectively shown. Because the stroke of the valve member 1000 is 90 degrees between the fully closed position and the fully open position, when the valve 100 is in the 50% open position, the valve member 1000 has been rotated by the valve actuator 45 degrees from the fully closed position depicted in FIGS. 9 and 10. (Note: the valve is effectively closed between 0 and 20 degrees rotation.) The 45 degree rotation position permits a portion 1100 of the flow passage 1002 to align with the flow opening 202 of the flow limiting disc 200, such that some amount of flow 1200 is permitted to enter the valve 100 through the inlet port 104, travel through the valve member 1000 and depart through the outlet port 106.

Figure 14:
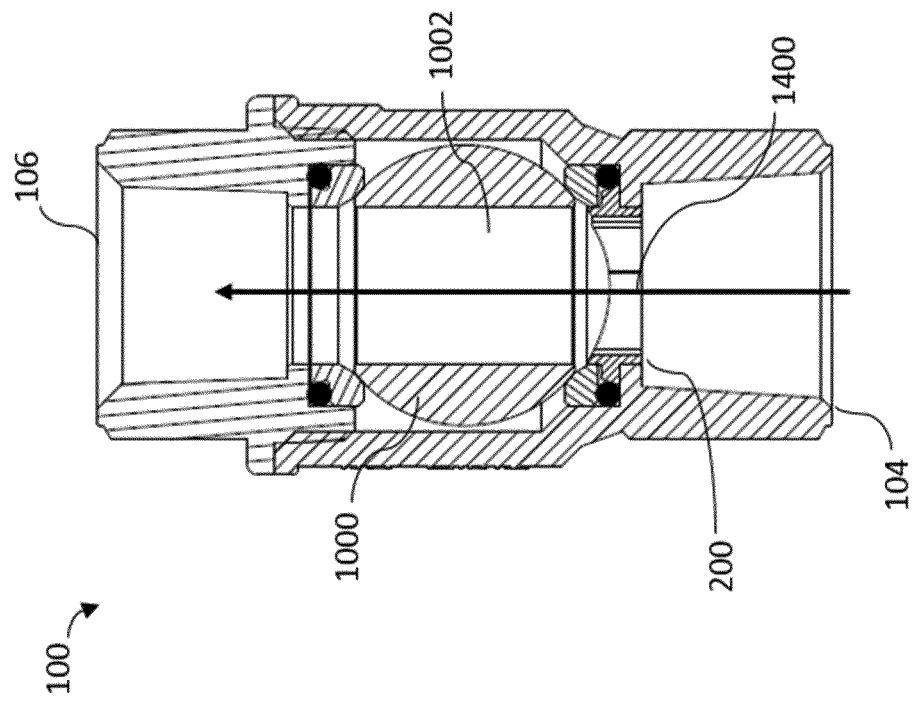
FIG. 14 is a top cross-sectional view drawing of the two-way ball valve of FIG. 13 in the fully open position.
Figure 13:
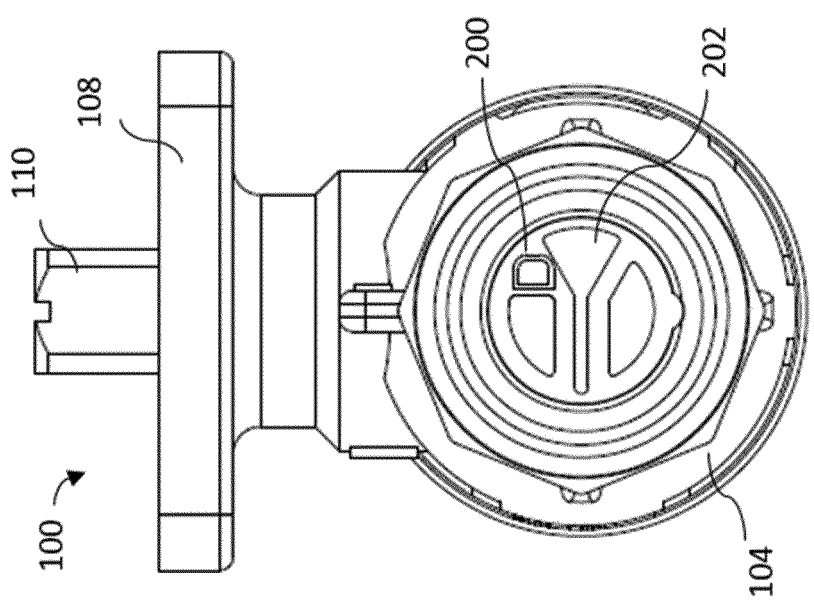
FIG. 13 is a side elevation view drawing of the two-way ball valve of FIG. 2 in the fully open position.

Finally, referring to FIGS. 13 and 14, a side view and a top cross-sectional view of the valve 100 in the fully (i.e., 100%) open position are respectively shown. In the fully open position, the valve member 1000 has been rotated by the valve actuator 90 degrees from the fully closed position depicted in FIGS. 9 and 10. No portion of the flow opening 202 in the flow limiting disc 200 is blocked by the valve member 1000, and the flow passage 1002 is aligned with the inlet port 104 and the outlet port 106 such that a flow of fluid 1400 is permitted to travel through the valve 100 and achieve a maximum flow coefficient Cv of 1.2.

Figure 15:
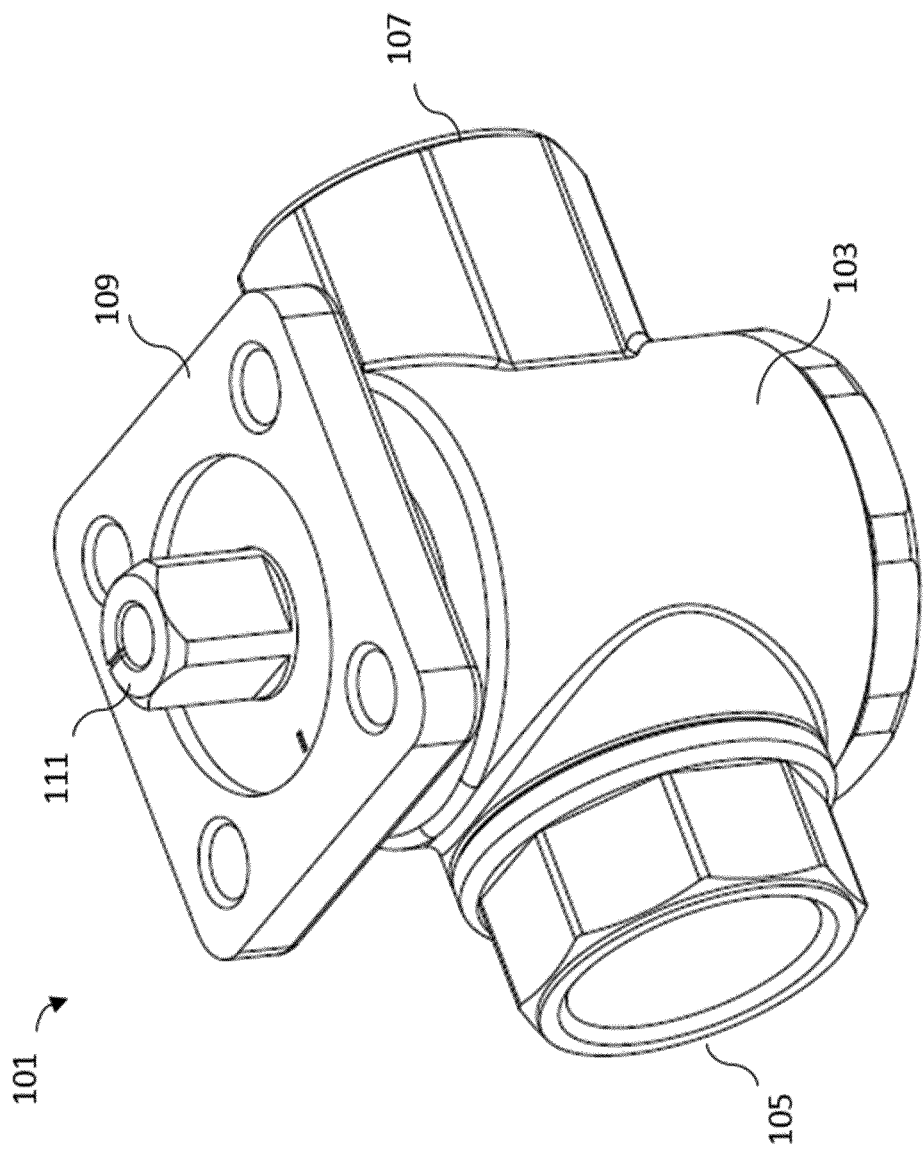
FIG. 15 is a perspective view drawing of a two-way ball valve with a high resolution 270 degree rotation valve member, according to some embodiments.
Figure 16:
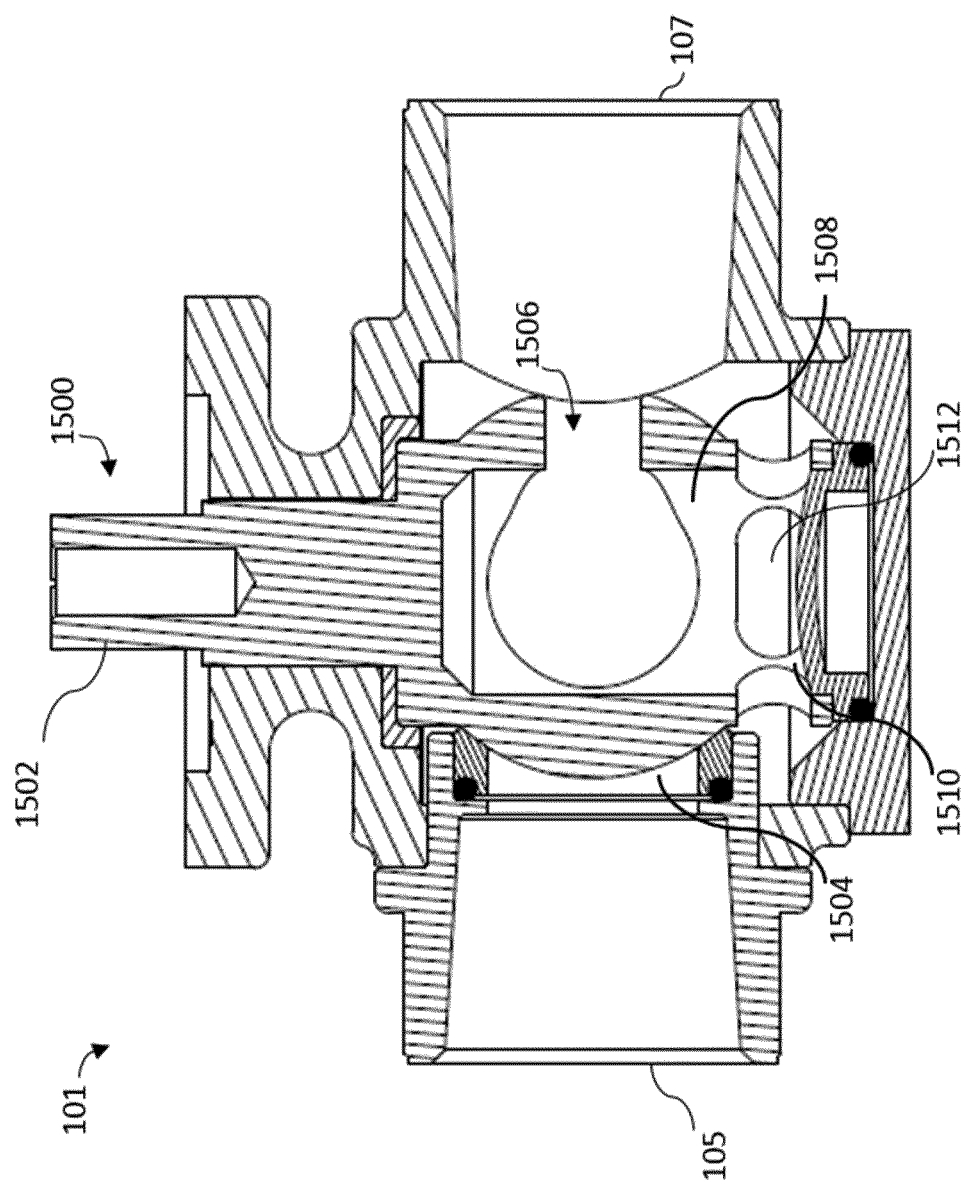
FIG. 16 is a front cross-sectional view drawing of the two-way ball valve of FIG. 15, according to some embodiments.

Turning now to FIGS. 15 and 16, a perspective view and a side cross-sectional view of a two-way valve assembly 101 with a high resolution 270 degree rotation valve member 1500 are respectively shown, according to some embodiments. Valve assembly 101 is shown to include a valve body 103 with an inlet port 105, an outlet port 107, and an actuator mounting flange 109. One end of a valve stem 111 may protrude from the actuator mounting flange 109 in order to couple to a valve actuator. Unlike the embodiment of the valve 100 depicted above with reference to FIGS. 1-14, the valve assembly 101 with the high resolution valve member 1500 is configured to couple to a valve actuator having a minimum rotational stroke of 270 degrees, as opposed to 90 degrees. The high resolution valve member 1500 is shown to include a valve stem portion 1502 and a ball member portion 1504. The ball member portion 1504 may also be referred as a movable valve member 1504. The valve stem portion 1502 is configured to couple to the valve actuator. In some embodiments, the valve stem portion 1502 and the ball member portion 1504 are fabricated as a single integrated component as depicted in FIG. 16. In other embodiments, the valve stem portion 1502 and the ball member portion 1504 are fabricated as separate components.

The ball member portion 1504 is shown to include a flow inlet opening 1506 surrounding a central bore 1508. As described in further detail below, the flow inlet opening 1506 may extend at least 270 degrees about the ball member portion 1504 to permit predictable flow control over the 270 degree stroke of the valve actuator. The valve member 1500 is further shown to include a base portion 1510 extending below the ball member portion 1504. The base portion 1510 is shown to include multiple flow outlet openings 1512 distributed about the base portion 1510. In some embodiments, the base portion 1510 includes four flow outlet openings 1512, and each flow outlet opening 1512 has an oblong shape. In other embodiments, the base portion 1510 may include any desired number of flow outlet openings 1512, with any desired geometry.

In operation, fluid enters the valve assembly 101 through the inlet port 105. If the valve member 1500 is oriented such that a portion of the flow inlet opening 1506 is aligned with the inlet port 105 (note: FIG. 16 depicts the valve 100 in a closed position), fluid enters the ball member portion 1504 through the flow inlet opening 1506 and flows downwards through the central bore 1508 to the base portion 1510. After exiting through the flow outlet openings 1512, the fluid flows around the exterior of the ball member portion 1504 before exiting the valve assembly 101 through the outlet port 107.

Figure 19:
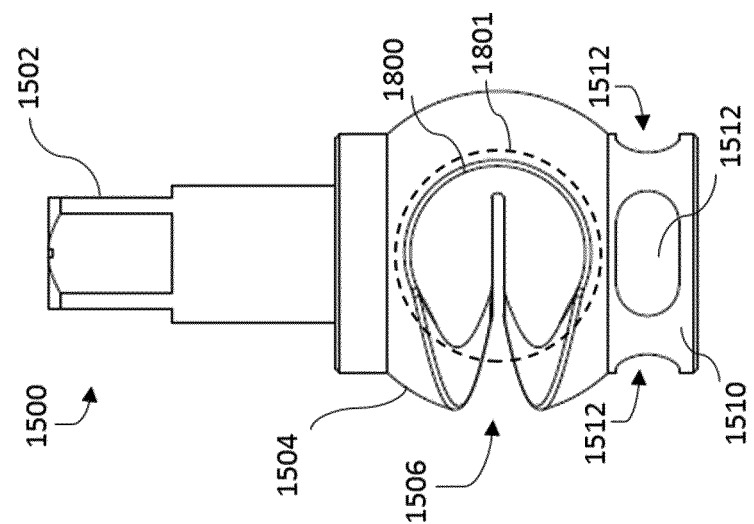
FIG. 19 is a side elevation view drawing of the valve member of FIG. 16 in a 270 degree rotation position, according to some embodiments.
Figure 18:
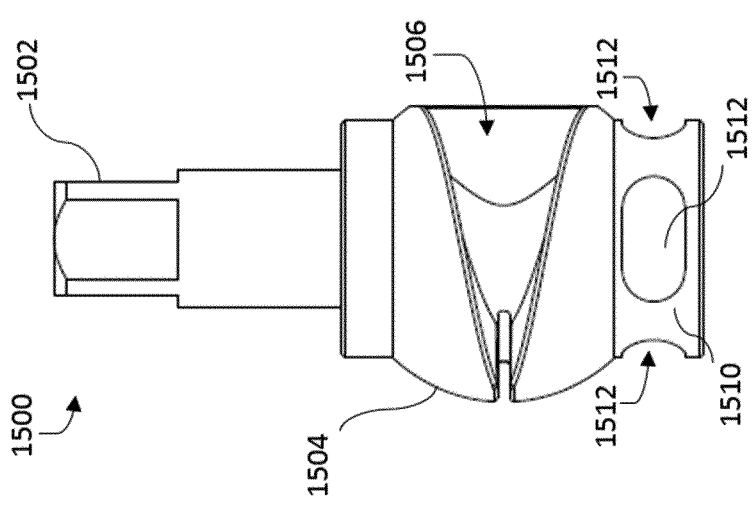
FIG. 18 is a side elevation view drawing of the valve member of FIG. 16 in a 180 degree rotation position, according to some embodiments.
Figure 17:
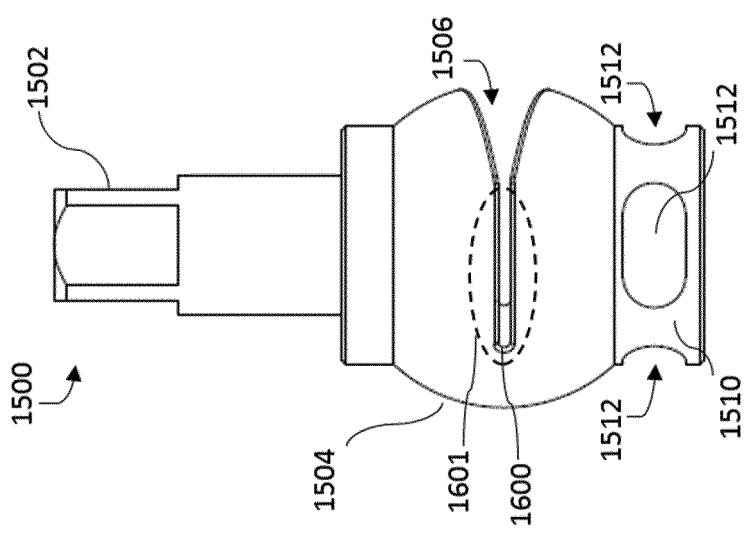
FIG. 17 is a side elevation view drawing of the valve member of FIG. 16 in a 90 degree rotation position, according to some embodiments.
Figure 20:
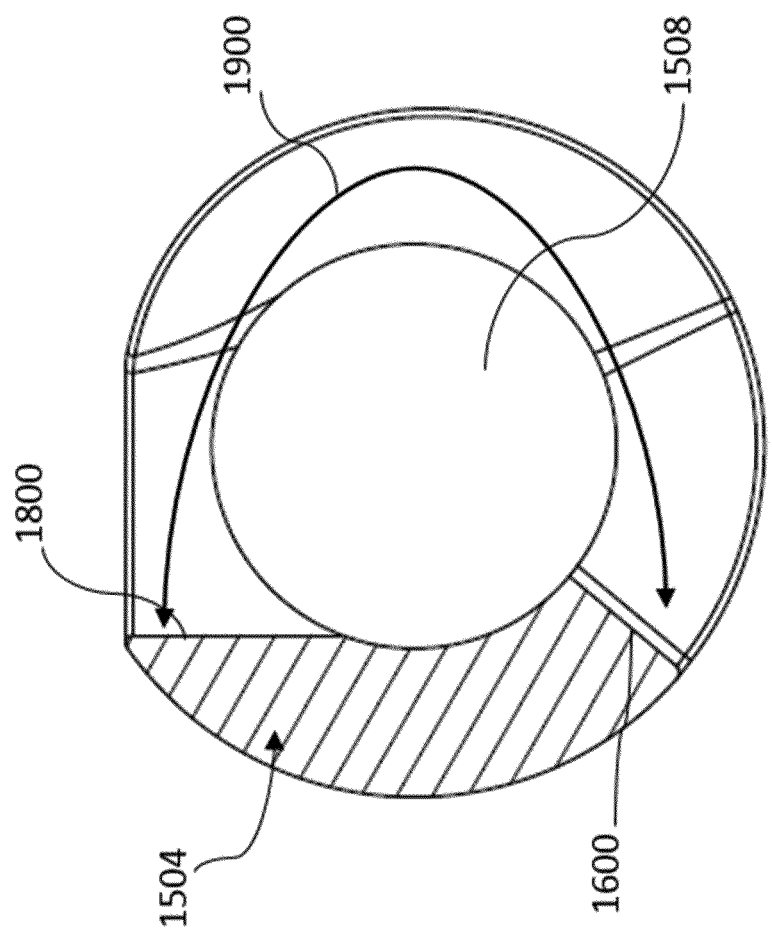
FIG. 20 is a top cross-sectional view drawing of the valve member of FIG. 16, according to some embodiments.

Referring now to FIGS. 17-19, views of the valve member 1500 in various rotational positions are depicted. FIG. 17 depicts the valve member 1500 in a 90 degree rotational position relative to the flow inlet of the valve (e.g., inlet port 105), FIG. 18 depicts the valve member 1500 in a 180 degree rotational position relative to the flow inlet of the valve, and FIG. 19 depicts the valve member 1500 in a 270 degree rotational position relative to the flow inlet of the valve. Referring specifically to FIG. 17, the flow inlet opening 1506 is shown to commence with a leading edge surface 1600 before extending around the ball member portion 1504 for a narrow slot region 1601. As shown in FIG. 18, the size of the flow inlet opening 1506 may increase gradually before terminating in a full bore region 1801 with a trailing edge surface 1800 as depicted in FIG. 19. The flow inlet opening 1506 in full bore 1801 region may have a size and shape (i.e., circular) to match the flow inlet 105 and permit maximum flow through the valve 101 when the valve member 1500 is in the 270 degree rotational position. Turning now to FIG. 20, a top cross-sectional view of the ball member portion 1504 is depicted, according to some embodiments. As shown, the total length 1900 of the flow inlet stretching from the leading edge surface 1600 to the trailing edge surface 1800 extends in excess of 180 degrees around the ball member portion 1504 and surrounding the central bore 1508.

Figure 21:
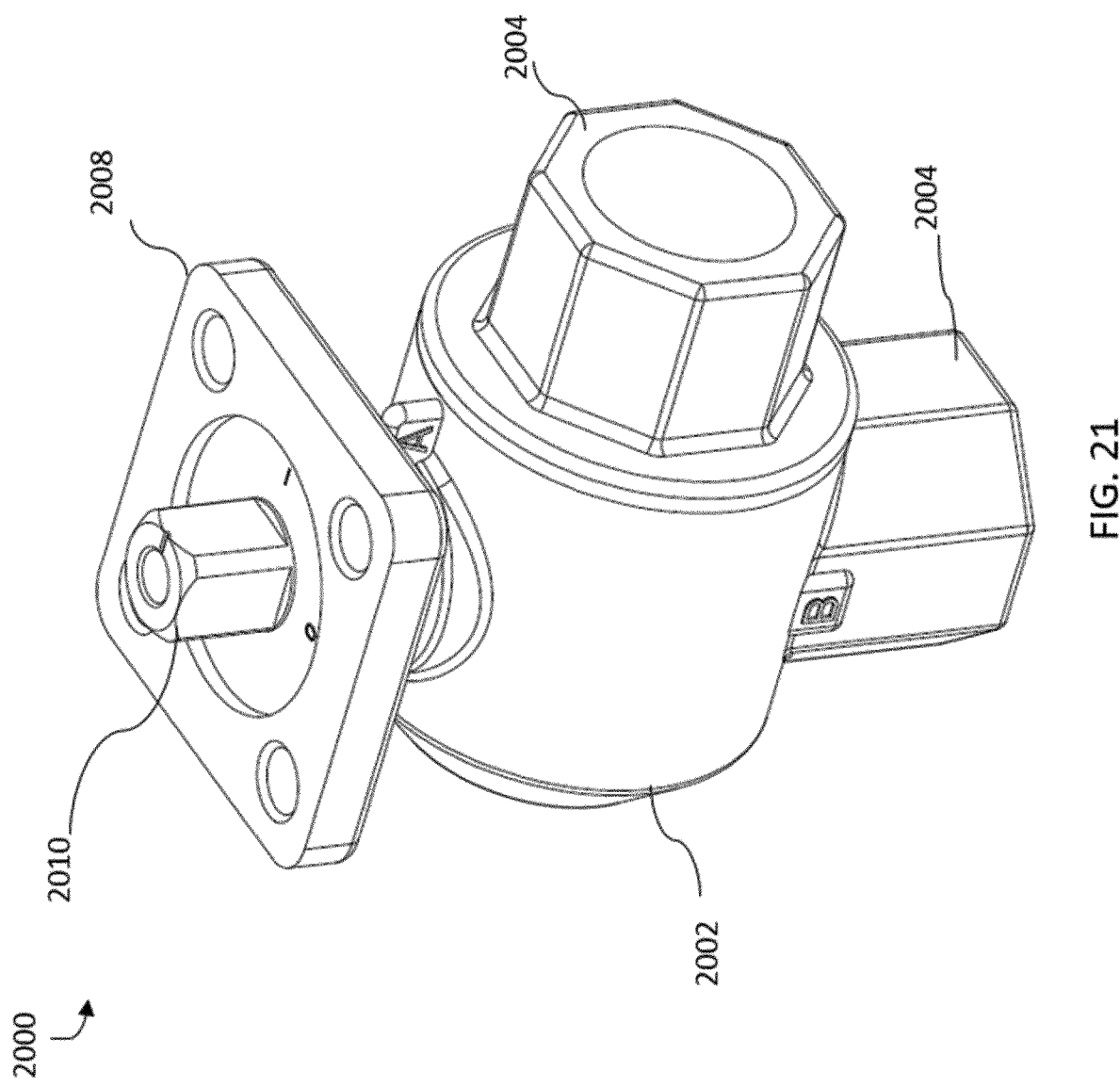
FIG. 21 is a perspective view drawing of a perpendicular port ball valve with a high resolution 270 degree rotation valve member, according to some embodiments.

FIG. 21 depicts another embodiment of a two-way valve 2000 configured to couple to a valve actuator having a 270 degree rotational stroke. Similar to valves 100 and 101 as described with respect to FIGS. 1 and 15 above, valve 2000 is shown to include a valve body 2002 with an inlet port 2004, an outlet port 2006, and an actuator mounting flange 2008. One end of the valve stem 2010 may protrude from the actuator mounting flange 2008 in order to couple to a valve actuator having a stroke of at least 270 degrees. The opposite end of the valve stem 2010 may be coupled to or integrated with a valve member (e.g., valve member 2100, described in further detail below with reference to FIGS. 22-24). In contrast to valve 101, the inlet port 2004 and the outlet port 2006 of the valve 2000 are situated 90 degrees apart or perpendicular to each other, as opposed to 180 degrees apart from each other (i.e., in-line).

Figure 22:
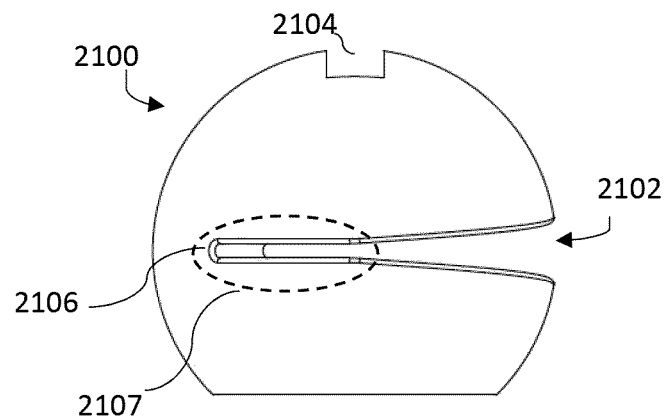
FIG. 22 is a side elevation view drawing of the valve member of FIG. 21 in a 90 degree rotation position, according to some embodiments.
Figure 23:
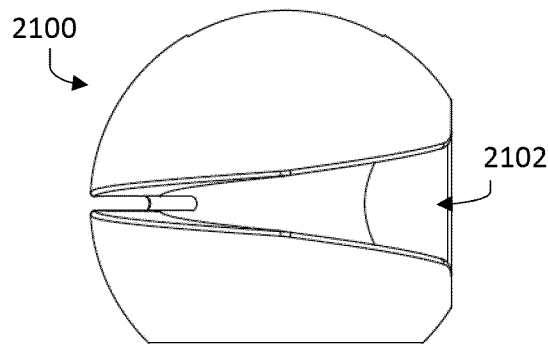
FIG. 23 is a side elevation view drawing of the valve member of FIG. 21 in a 180 degree rotation position, according to some embodiments.
Figure 24:
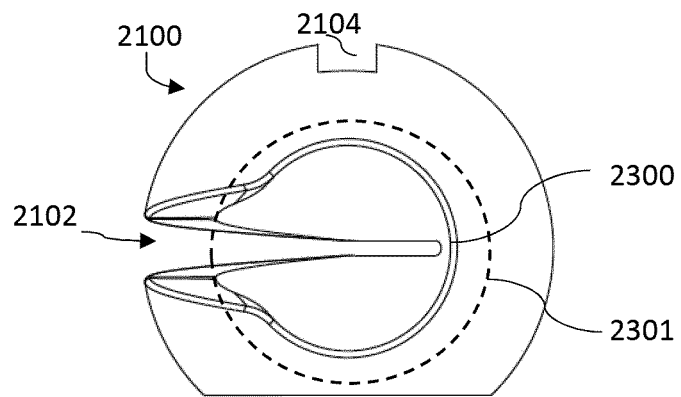
FIG. 24 is a side elevation view drawing of the valve member of FIG. 21 in a 270 degree rotation position, according to some embodiments.

Turning now to FIGS. 22-24, views of the valve member 2100 in various rotational positions are depicted. FIG. 22 depicts the valve member 2100 in a 90 degree rotational position relative to a fully closed orientation, FIG. 23 depicts the valve member 2100 in a 180 degree rotational position relative to a fully closed orientation, and FIG. 24 depicts the valve member 2100 in a 270 degree rotational position relative to a fully closed orientation. Referring specifically to FIG. 22, the flow inlet opening 2102 is shown to commence with a leading edge surface 2106 before extending around the valve member 2100 for a narrow slot region 2107. Slot 2104 may be situated at the top of the valve member 2100 in order to receive a valve stem (e.g., valve stem 2010). As shown in FIG. 23, the size of the flow inlet opening 2102 may increase gradually before terminating in a full bore region 2301 with a trailing edge surface 2300 as depicted in FIG. 24. The flow inlet opening 2102 in the full bore region 2301 may have a size and shape (i.e., circular) to match the flow inlet 2004 and permit maximum flow through the valve 2000 when the valve member 2100 is in the 270 degree rotational position. The valve member 2100 has a similar configuration of flow inlet opening 2102 as that of valve 101 having a flow inlet opening 1506 and in contrast is equipped with a hollow portion and has one or more flow outlets directly at the bottom which may have an flow axis in-line with the valve stem or is has an axis which is perpendicular to the axis of inlet port 2004. In some embodiments, the valve member 2100 is envisages the one or more flow outlet portions as one single hollow hole or outlet. In some embodiments, the valve outlet may be in fabricated in the form of one or more holes having the capability of passing the fluid flow in an efficiently.

Figure 26:
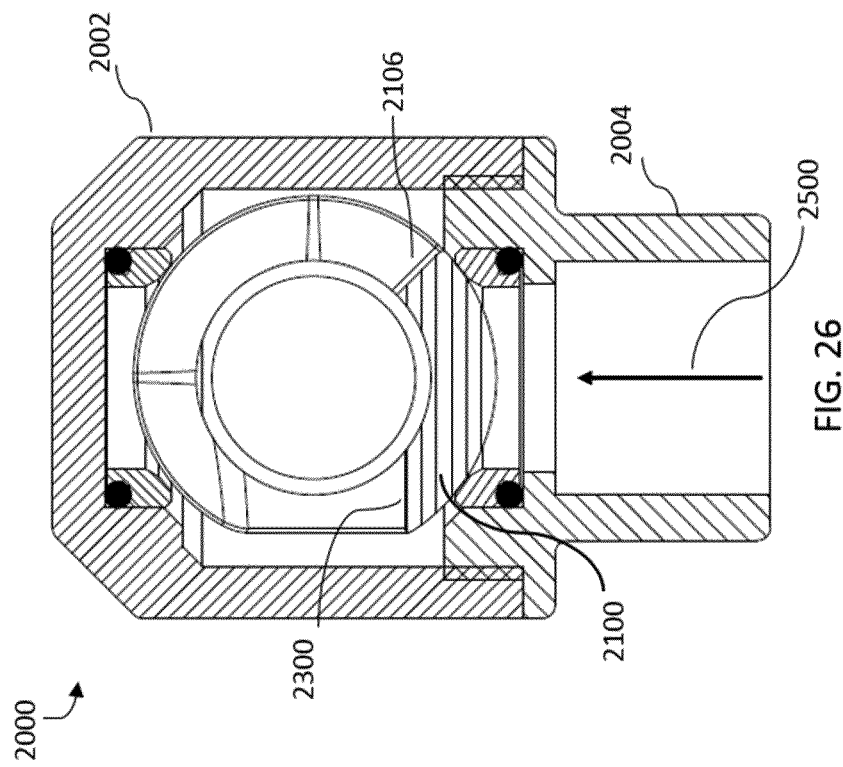
FIG. 26 is a top cross-sectional view drawing of the perpendicular port two-way ball valve of FIG. 25 in the closed position, according to some embodiments.
Figure 25:
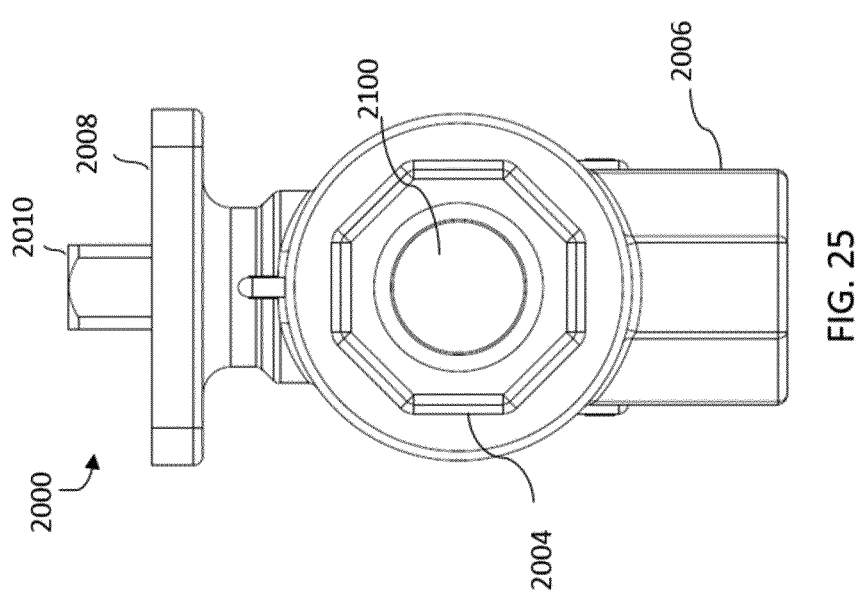
FIG. 25 is a side elevation view drawing of the perpendicular port two-way ball valve of FIG. 21 in the closed position, according to some embodiments.
Figure 28:
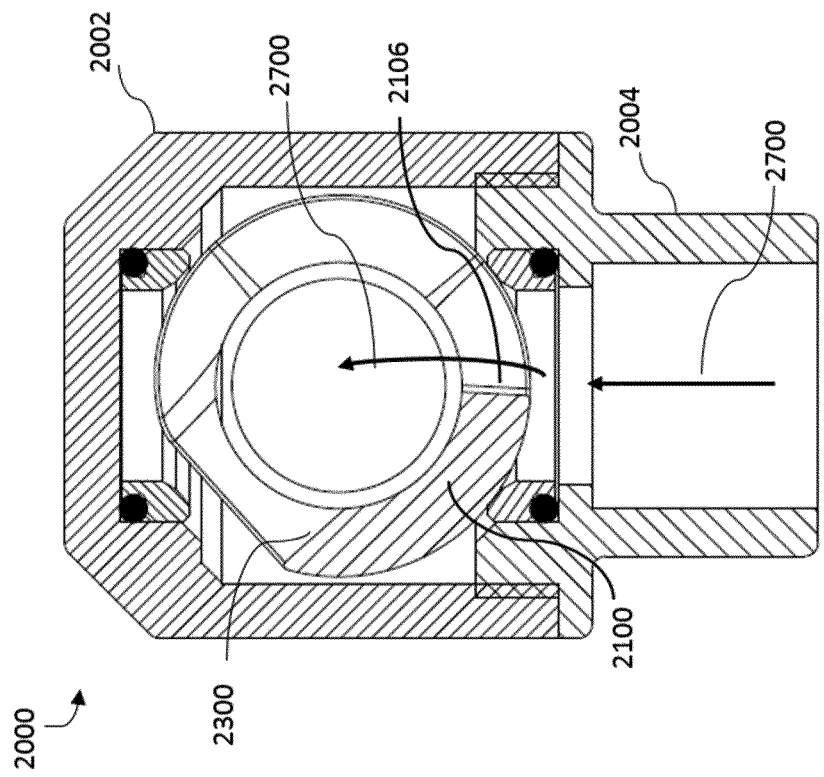
FIG. 28 is a top cross-sectional view drawing of the perpendicular port two-way ball valve of FIG. 27 in the low flow position, according to some embodiments.
Figure 27:
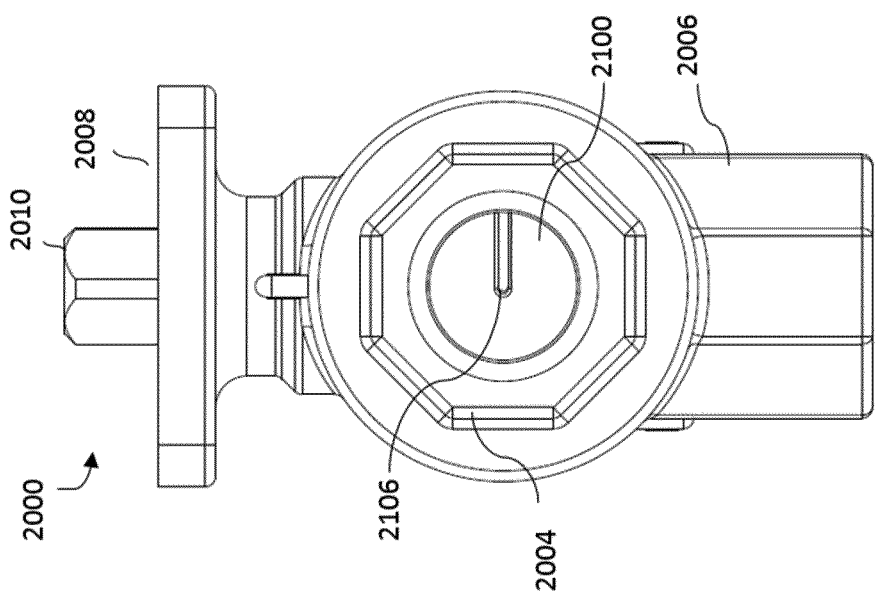
FIG. 27 is a side elevation view drawing of the perpendicular port two-way ball valve of FIG. 21 in the low flow position, according to some embodiments.

Referring now to FIGS. 25-34, the operation of the two-way ball valve 2000 over a 270 degree rotational stroke is depicted, according to some embodiments. FIGS. 25 and 26 respectively depict a side view and a top cross-sectional view of the valve 2000 in the closed (i.e., 0% open) position, in which a flow of fluid 2500 entering the inlet port 2004 is blocked from flowing through the valve member 2100 and exiting through the outlet port 2006. FIGS. 27 and 28 respectively depict a side view and a top cross-sectional view of the valve 2000 in a low flow position. In order to achieve the low flow position, the valve member 2100 is shown to be rotated 45 degrees relative to the inlet port 2004 from the closed position. The 45 degree rotation of the valve member 2100 exposes the leading edge surface 2106 to the inlet port 2004, thus permitting a minimal amount of flow 2700 to pass through the inlet port 2004 and enter the valve member 2100 before flowing downwards and exiting through the outlet port 2006.

Figure 30:
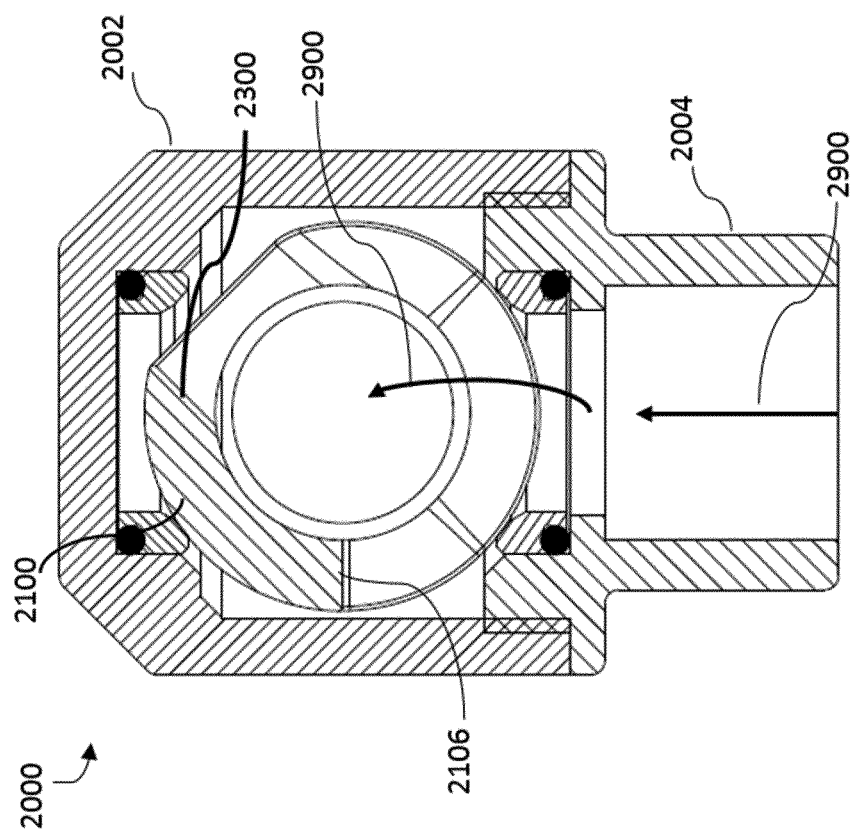
FIG. 30 is a top cross-sectional view drawing of the perpendicular port two-way ball valve of FIG. 29 in the medium flow position, according to some embodiments.
Figure 29:
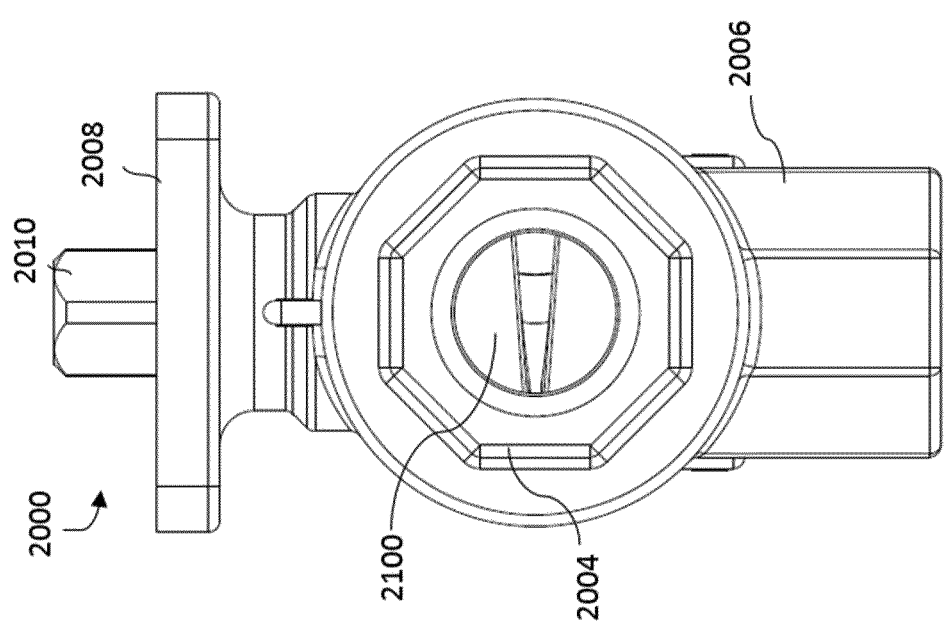
FIG. 29 is a side elevation view drawing of the perpendicular port two-way ball valve of FIG. 21 in the medium flow position, according to some embodiments.
Figure 32:
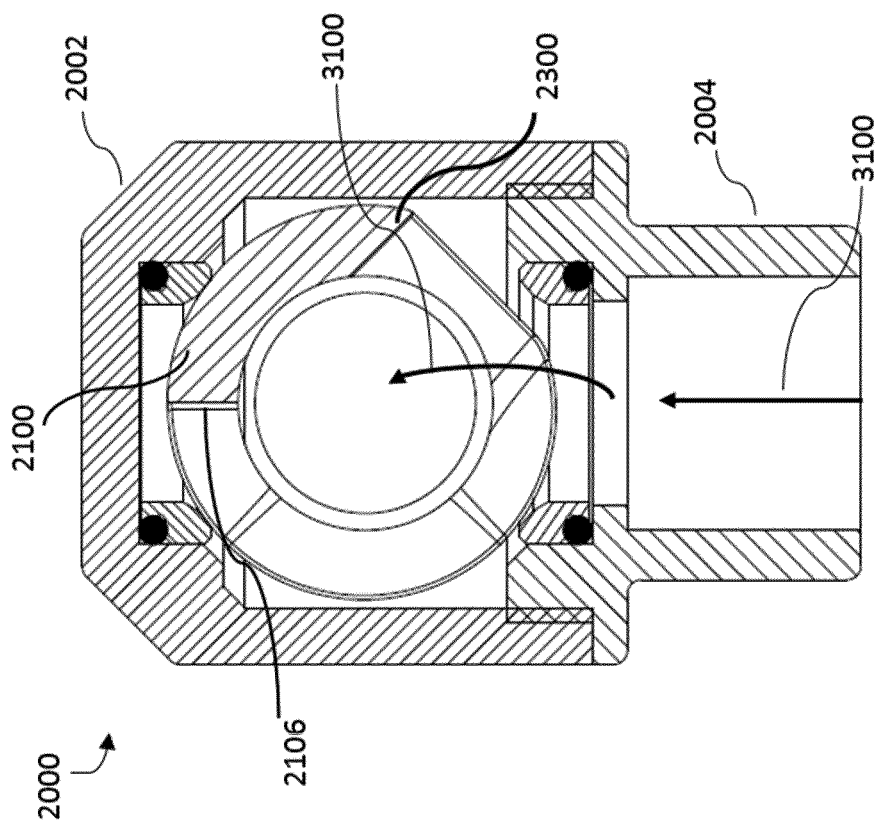
FIG. 32 is a top cross-sectional view drawing of the perpendicular port two-way ball valve of FIG. 31 in the high flow position, according to some embodiments.
Figure 31:
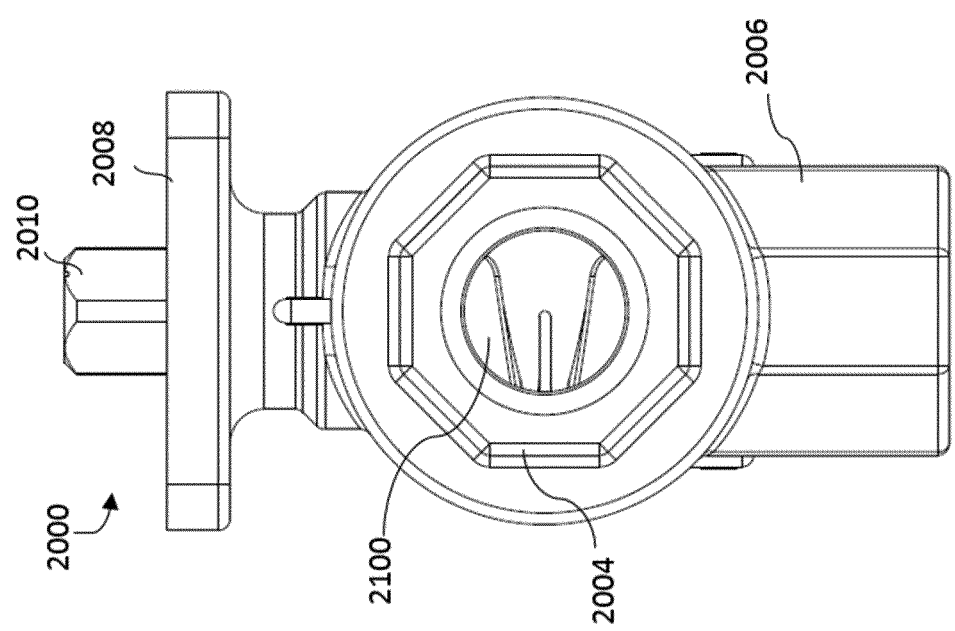
FIG. 31 is a side elevation view drawing of the perpendicular port two-way ball valve of FIG. 21 in the high flow position, according to some embodiments.

FIGS. 29 and 30 respectively depict a side view and a top cross-sectional view of the valve 2000 in a medium flow position. In order to achieve the medium flow position, the valve member 2100 is shown to be rotated 135 degrees relative to the inlet port 2004 from the closed position, or 90 degrees from the low flow position depicted in FIGS. 27 and 28. By rotating the valve member 2100 to the medium flow position, a medium amount of flow 2900 is permitted to pass through the inlet port 2004 and to enter the valve member 2100 before flowing downwards and exiting through the outlet port 2006. Similarly, FIGS. 31 and 32 respect a side view and a top cross-sectional view of the valve 2000 in a high flow position. In order to achieve the high flow position, the valve member 2100 is shown to be rotated 225 degrees relative to the inlet port 2004 from the closed position, or 90 degrees from the medium flow position depicted in FIGS. 29 and 30, thus permitting a high amount of flow 3100 to pass through the inlet port 2004 and to enter the valve member 2100 before flowing downwards and exiting through the outlet port 2006.

Figure 34:
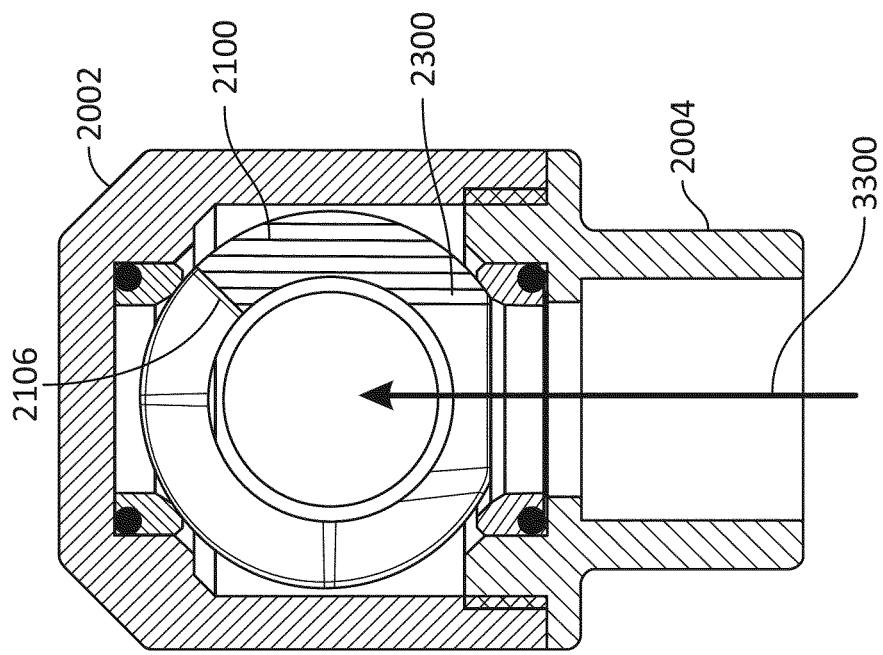
FIG. 34 is a top cross-sectional view drawing of the perpendicular port two-way ball valve of FIG. 33 in the full flow position, according to some embodiments.
Figure 33:
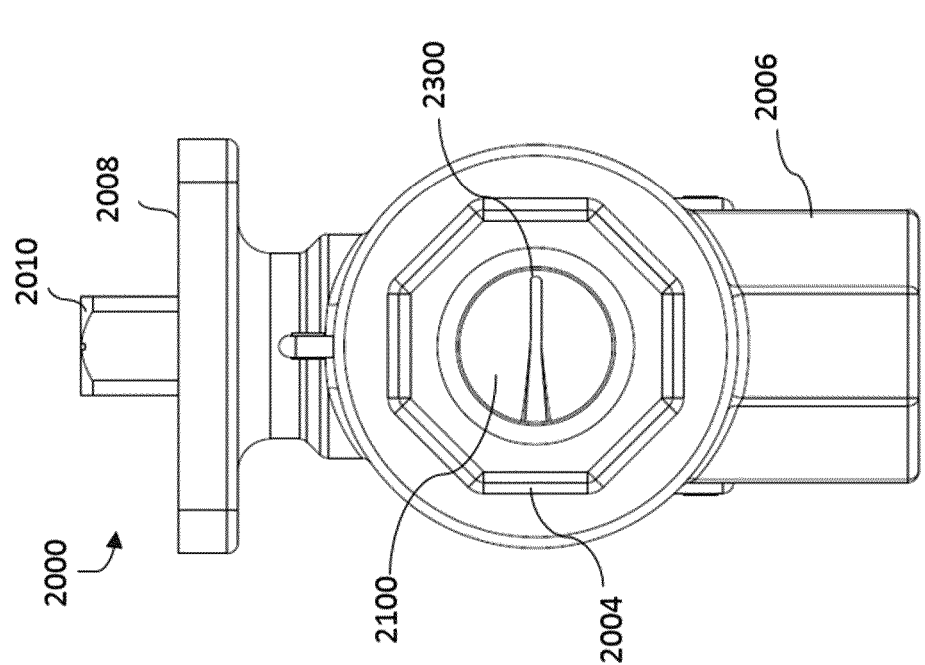
FIG. 33 is a side elevation view drawing of the perpendicular port two-way ball valve of FIG. 21 in the full flow position, according to some embodiments.

FIGS. 33 and 34 respectively depict a side view and a top cross-sectional view of the valve 2000 in a full flow position. In order to achieve the full flow position, the valve member 2100 is shown to be rotated 270 degrees relative to the inlet port 2004 from the closed position, or 90 degrees from the high flow position depicted in FIGS. 31 and 32 such that the trailing edge surface 2300 is aligned with the bore of the inlet port 2004, thus permitting a full amount of flow 3300 to pass through the inlet port 2004 and to enter the valve member 2100 before exiting through the outlet port 2006.

Figure 35:
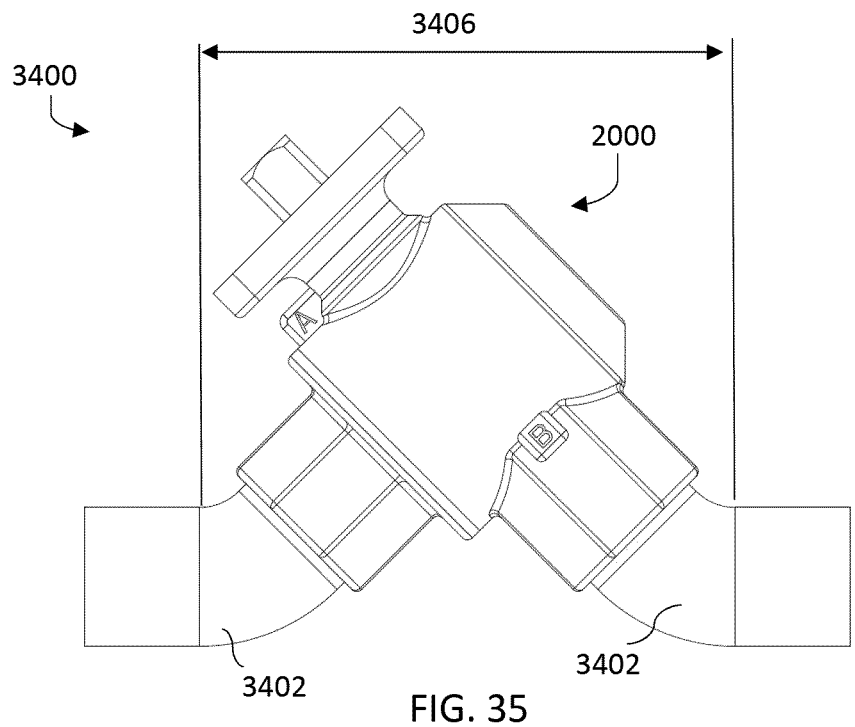
FIG. 35 is a front elevation view drawing of the perpendicular port two-way ball valve of FIG. 21 in an installed configuration, according to some embodiments.
Figure 36:
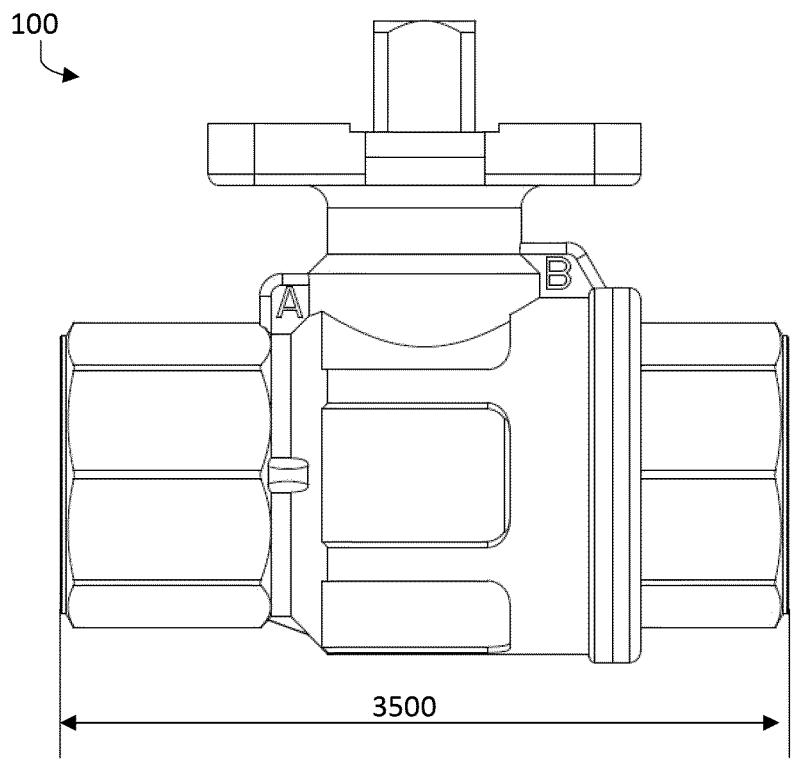
FIG. 36 is a front elevation view drawing of the two-way ball valve of FIG. 1, according to some embodiments.

Referring now to FIG. 35, a front elevation view of the valve 2000 in an installed configuration is depicted, according to some embodiments. Because the inlet port and the outlet port of the valve 2000 are oriented 90 degrees relative to each other, 45 degree elbow components 3402 and 3404 may be coupled upstream and downstream of the valve 2000 to achieve a 180 degree piping solution. As shown, including the elbow components 3402 and 3404, the installation length 3406 of the valve 2000 is approximately equivalent to the overall length 3500 of the 90 degree rotation two-way valve 100 as depicted in FIG. 36.

Figure 37:
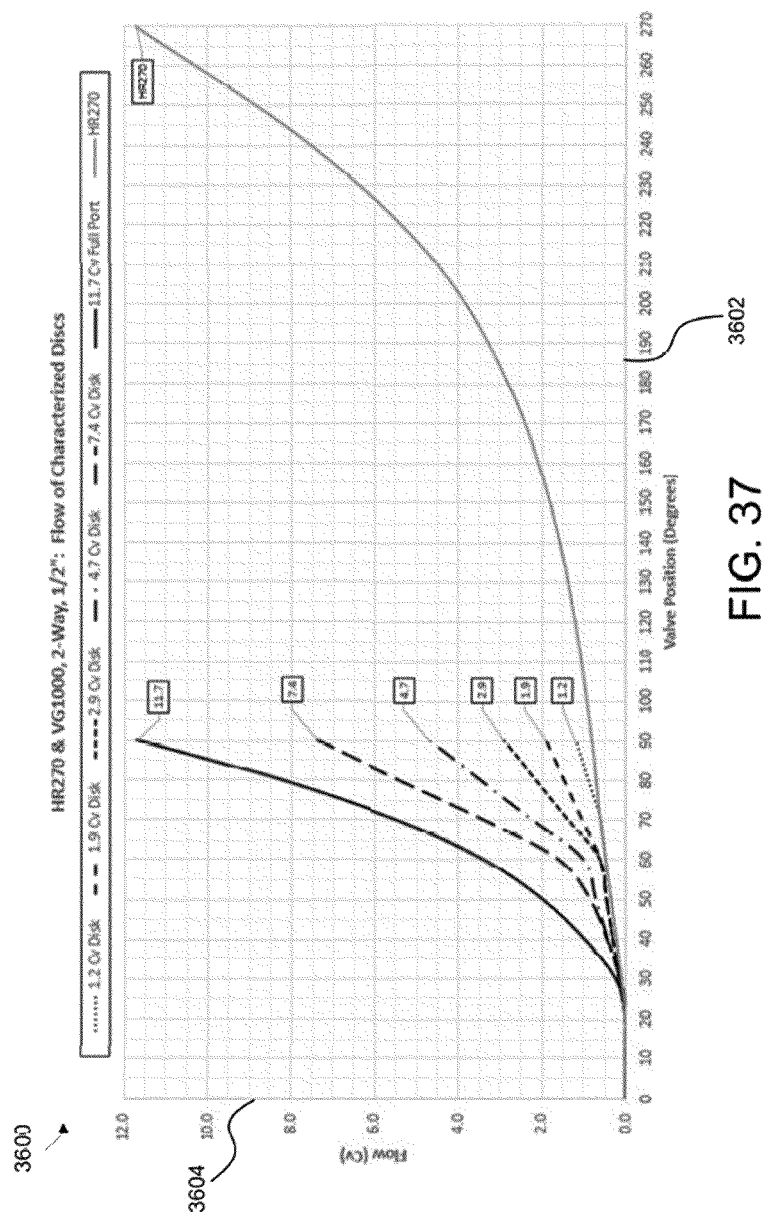
FIG. 37 is a plot relating valve position and flow for the two-way ball valve of FIG. 1 and the perpendicular port two-way ball valve with a high resolution 270 degree rotation valve member of FIG. 21, according to some embodiments.

Turning now to FIG. 37, plot 3600 is depicted relating valve position on the x-axis 3602 in units of degrees rotation and the maximum flow coefficient on the y-axis 3604 in imperial units (i.e., Cv). Plot 3600 is shown to include both data for the 270 degree rotation valve and the 90 degree rotation valve (also included in plot 800 and described above with reference to FIG. 8). As shown, the 270 degree rotation ball valve is able to achieve a maximum flow coefficient Cv of approximately 11.7, similar to the full port configuration of the 90 degree rotation valve. However, the flow through the 270 degree rotation ball valve is far more linear than that of the 90 degree rotation ball valve, meaning that changes in valve member position for the 270 degree rotation ball valve result in more predictable changes in flow, and the valve can be controlled to a greater number of flow values in total. In other words, the 270 degree rotation valve has higher resolution than the 90 degree rotation valve.

It is to be understood that the embodiments disclosed in the present specification is described with the inlet opening extending from a leading edge surface present at the narrow slot region to a trailing edge surface present at a full bore region. However, it is not necessary that every time the leading edge surface present at the narrow slot region ends with the trailing edge at the full bore region. Therefore, there may be embodiments where the leading edge surface present at the narrow slot region ends with the trailing edge any other region of the inlet opening.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A valve assembly comprising:
   a valve body defining an enclosure having an inlet port and an outlet port;
   a movable valve member disposed in the enclosure and comprising an inlet opening having a length extending from a leading edge surface present at a slot region to a trailing edge surface present at a full bore region, wherein a width of the inlet opening at the slot region is less than a width of the inlet opening at the full bore region, and wherein the width of the inlet opening at the slot region is generally constant along a portion of the length of the inlet opening; and
   a central bore present within the movable valve member configured to receive fluid from the inlet opening, wherein the central bore extends below the movable valve member to a base portion comprising one or more outlet openings;
   wherein the fluid flow from the inlet port to the outlet port of the valve body is controlled by a rotation of the movable valve member.

2. The valve assembly of claim 1, wherein a valve stem is coupled to the movable valve member.

3. The valve assembly of claim 2, wherein the valve body further comprises a flange configured to engage with an actuator.

4. The valve assembly of claim 3, wherein the valve stem is configured to receive a rotation force from the actuator.

5. The valve assembly of claim 1, wherein the angle between the leading edge surface and the trailing edge surface at the center of the movable valve member is 270 degrees.

6. The valve assembly of claim 1, wherein the inlet port and the outlet port have a same center line and are situated 180 degrees apart having the movable valve member in between.

7. The valve assembly of claim 4, wherein the angle between the leading edge surface and the trailing edge surface at the center of the movable valve member is greater than 90 degrees.

8. A valve assembly comprising:
   a valve body defining an enclosure having an inlet port and an outlet port;
   a movable valve member comprising:
      an inlet opening extending 270 degrees around a circumference of the movable valve member from a leading edge surface present at a slot region to a trailing edge surface present at a full bore region, wherein a width of the inlet opening at the slot region is less than a width of the inlet opening at the full bore region, and wherein the width of the inlet opening at the slot region is generally constant along a portion of the length of the inlet opening; and
      one or more outlet openings;
   wherein the fluid flow from the inlet port to the outlet port of the valve body is controlled by a rotation of the movable valve member.

9. The valve assembly of claim 8, wherein a valve stem is coupled to the movable valve member.

10. The valve assembly of claim 9, wherein the valve body further comprises a flange configured to engage with an actuator.

11. The valve assembly of claim 10, wherein the valve stem is configured to receive a rotation force from the actuator.

12. The valve assembly of claim 8, wherein the one or more outlet openings are located at a base of the movable valve member.

13. The valve assembly of claim 8, wherein the movable valve member comprises a through bore to enable the fluid flow to pass from the inlet opening to the one or more outlet openings.

14. The valve assembly of claim 8, wherein the inlet port and the outlet port are orthogonal to each other.

15. The valve assembly of claim 8, wherein rotation of the movable valve member from the leading edge surface to the trailing edge surface increases the fluid flow from the valve assembly.

16. A method of controlling a fluid flow through a valve assembly, the method comprising:
   providing a valve body defining an enclosure having an inlet port and outlet port
   providing a movable valve member disposed in the enclosure wherein the movable valve member comprising an inlet opening extending 270 degrees around a circumference of the movable valve member from a leading edge surface present at a slot region to a trailing edge surface present at a full bore region, wherein a width of the inlet opening at the slot region is less than a width of the inlet opening at the full bore region, and wherein the width of the inlet opening at the slot region is generally constant along a portion of the length of the inlet opening;
   causing the movable valve member to rotate to control fluid flow from the inlet port to the outlet port.

17. The method of claim 16, wherein the inlet port and the outlet port either have a same center line and are situated 180 degrees apart or are orthogonal to each other.

18. The method of claim 16, further comprising engaging the valve body to an actuator.

* * * * *